United States Patent
Hamana et al.

(10) Patent No.: US 9,646,564 B2
(45) Date of Patent: May 9, 2017

(54) INFORMATION PROCESSING APPARATUS THAT CONTROLS DISPLAY OF DISPLAY SECTIONS OF CONTENTS, METHOD OF CONTROLLING THE SAME, AND STORAGE MEDIUM

(71) Applicant: CANON KABUSHIKI KAISHA, Tokyo (JP)

(72) Inventors: Akihiro Hamana, Tokyo (JP); Satoshi Watanabe, Tokyo (JP); Koichi Tanabe, Kawasaki (JP); Satoshi Igeta, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 515 days.

(21) Appl. No.: 13/741,545

(22) Filed: Jan. 15, 2013

(65) Prior Publication Data
US 2013/0187944 A1   Jul. 25, 2013

(30) Foreign Application Priority Data

Jan. 20, 2012  (JP) .................................. 2012-010102
Jan. 20, 2012  (JP) .................................. 2012-010103

(51) Int. Cl.
*G09G 5/00*  (2006.01)
*G09G 5/14*  (2006.01)
(Continued)

(52) U.S. Cl.
CPC ........... *G09G 5/003* (2013.01); *G06F 3/0483* (2013.01); *G06F 3/0485* (2013.01); *G09G 5/14* (2013.01)

(58) Field of Classification Search
CPC ........ G09G 5/003; G09G 5/14; G06F 3/0483; G06F 3/0485
(Continued)

(56) References Cited

U.S. PATENT DOCUMENTS 6,016,502 A * 1/2000 Haneda ................. G06F 3/0481
                                                                      345/87
7,487,444 B2 * 2/2009 Lira ....................... G06F 3/0485
                                                                      715/227
(Continued)

FOREIGN PATENT DOCUMENTS

JP    2002203185 A   7/2002
JP    2006195852 A   7/2006
(Continued)

OTHER PUBLICATIONS

Japanese Office action issued in counterpart Japanese application No. JP2012-010103, dated Nov. 10, 2015.
(Continued)

*Primary Examiner* — Jacinta M Crawford
*Assistant Examiner* — Terrell Robinson
(74) *Attorney, Agent, or Firm* — Rossi, Kimms & McDowell LLP

(57) ABSTRACT

An information processing apparatus that is capable of displaying, when displaying a large number of contents in a manner divided into a plurality of pages, the contents in a manner such that continuity between each other is maintained, and enables a user to easily recognize the contents located in the vicinity of each page boundary. The information processing apparatus includes a CPU which selects and arranges the contents such that contents selected as objects to be displayed are redundant between adjacent display sections at a predetermined ratio, and subjects displays the contents to screen display in a display area, on a display section-by-display section basis.

6 Claims, 15 Drawing Sheets

(51) Int. Cl.
*G06F 3/0483* (2013.01)
*G06F 3/0485* (2013.01)

(58) Field of Classification Search
USPC .......................................................... 345/619
See application file for complete search history.

(56) References Cited

U.S. PATENT DOCUMENTS

| | | | |
|---|---|---|---|
| 8,095,892 B2* | 1/2012 | Anthony | G06F 3/04815 715/788 |
| 8,493,825 B2 | 7/2013 | Koda | |
| 2002/0087431 A1 | 7/2002 | Morishima | |
| 2002/0196289 A1* | 12/2002 | Sakamoto | G09G 5/00 715/838 |
| 2006/0119615 A1* | 6/2006 | Zhou et al. | 345/619 |
| 2008/0174597 A1* | 7/2008 | Takagi | 345/418 |
| 2009/0089056 A1* | 4/2009 | Fujii | G06F 17/30746 704/246 |
| 2009/0119589 A1* | 5/2009 | Rowell | G06F 3/04817 715/716 |
| 2011/0175978 A1* | 7/2011 | Ito | 348/43 |
| 2011/0187751 A1* | 8/2011 | Oyama | G09G 5/00 345/666 |
| 2011/0221780 A1* | 9/2011 | Inada | G09G 5/36 345/660 |

FOREIGN PATENT DOCUMENTS

| | | |
|---|---|---|
| JP | 2007-157033 A | 6/2007 |
| JP | 2008-176658 A | 7/2008 |
| JP | 2009049848 A | 3/2009 |
| JP | 2010033228 A | 2/2010 |

OTHER PUBLICATIONS

Japanese Office action issued in counterpart Japanese application No. JP2012-010102, dated Nov. 10, 2015.

* cited by examiner

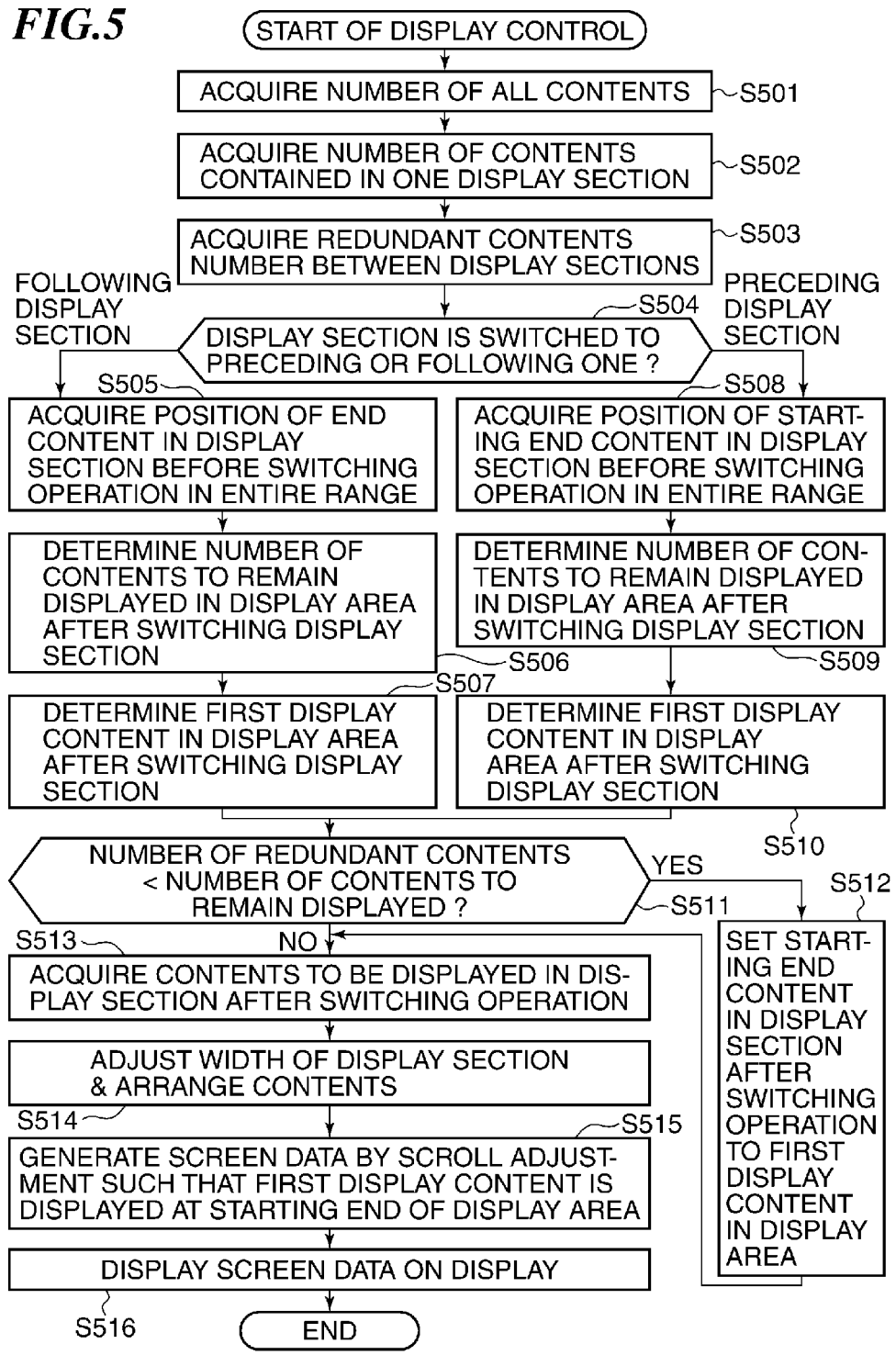

*FIG.15A*

| A1 | A4 | B3 | C2 | D1 | D4 |
|----|----|----|----|----|----|
| A2 |    | B4 | C3 | D2 |    |
| A3 |    | B1 | C4 | D3 |    |
|    |    | B2 |    |    |    |

*FIG.15B* 1502, 1503

| A1 | A4 | B3 | C2 | D1 |
|----|----|----|----|----|
| A2 |    | B4 | C3 | D2 |
| A3 |    | B1 | C4 | D3 |
|    |    | B2 |    |    |

FIRST DISPLAY SECTION A

*FIG.15C* 1504

| C2 | D1 | D4 | E3 | F2 |
|----|----|----|----|----|
| C3 | D2 |    | E4 | F3 |
| C4 | D3 |    | E1 | F4 |
| C1 |    |    | E2 |    |
|    |    |    | F1 |    |

*FIG.15D* 1505

| C2 | D1 | D4 | E3 | F2 |
|----|----|----|----|----|
| C3 | D2 |    | E4 | F3 |
| C4 | D3 |    | E1 | F4 |
|    |    |    | E2 |    |

SECOND DISPLAY SECTION B

*FIG.15E* 1506

| E3 | F2 | G1 | G4 | H3 |
|----|----|----|----|----|
| E4 | F3 | G2 | H1 | H4 |
| E1 | F4 | G3 | H2 |    |
| E2 |    |    |    |    |

*FIG.15F* 1507

| E3 | F2 | G1 | G4 |
|----|----|----|----|
| E4 | F3 | G2 | H1 |
| F1 | F4 | G3 | H2 |

THIRD DISPLAY SECTION C

*FIG.15G* 1508

| G1 | G4 | H3 | I2 | J1 | J4 |
|----|----|----|----|----|----|
| G2 | H1 | H4 | I3 | J2 |    |
| G3 | H2 | I1 | I4 | J3 |    |

*FIG.15H* 1509

| G1 | G4 | H3 | I2 | J1 | J4 |
|----|----|----|----|----|----|
| G2 | H1 | H4 | I3 | J2 |    |
| G3 | H2 | I1 | I4 | J3 |    |

FOURTH DISPLAY SECTION D

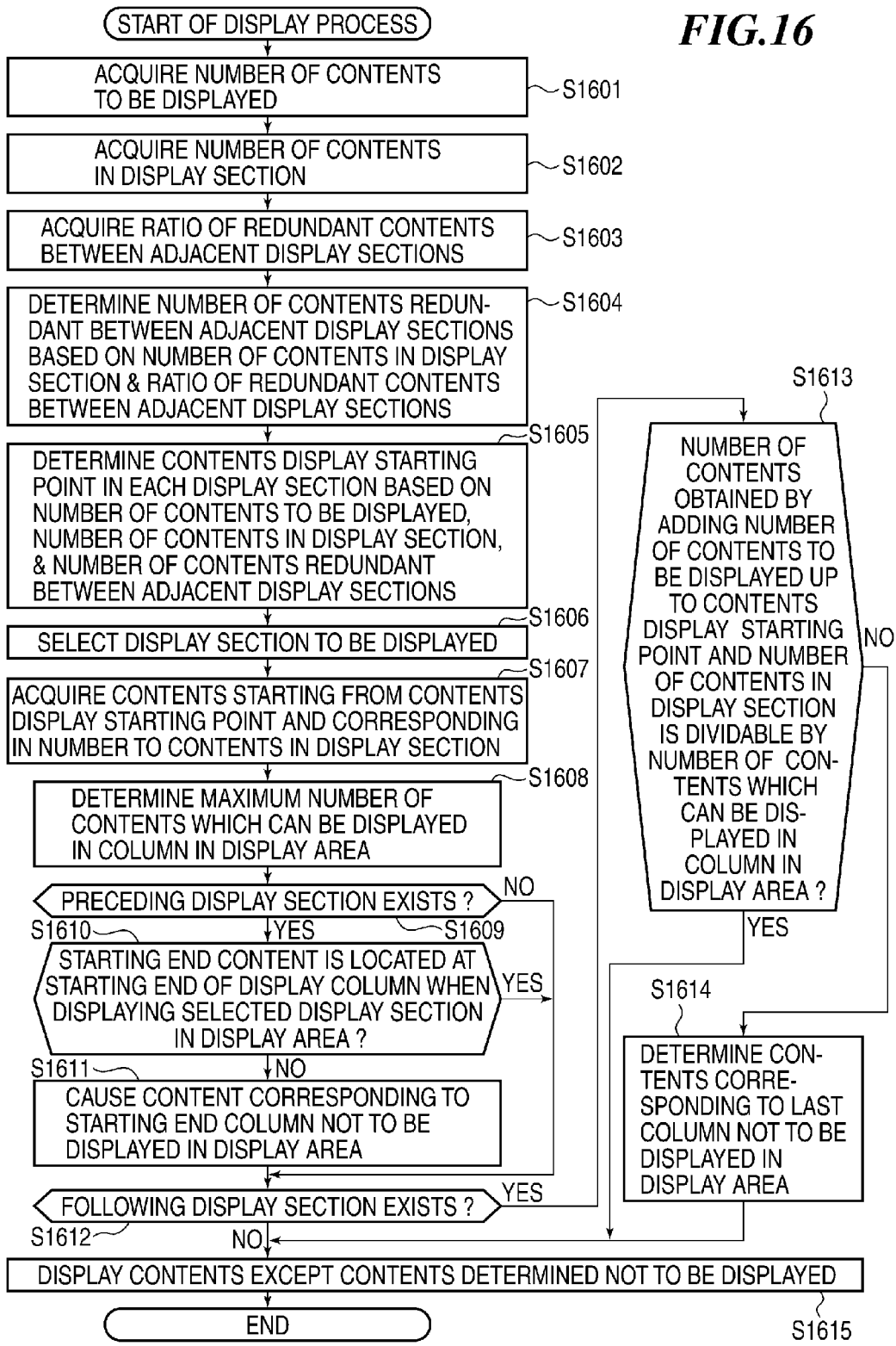

INFORMATION PROCESSING APPARATUS THAT CONTROLS DISPLAY OF DISPLAY SECTIONS OF CONTENTS, METHOD OF CONTROLLING THE SAME, AND STORAGE MEDIUM

BACKGROUND OF THE INVENTION

Field of the Invention

The present invention relates to an information processing apparatus that divides a large number of contents and displays the divided contents page by page, a method of controlling the information processing apparatus, and a storage medium, and more particularly to control for maintaining continuity of display of contents.

Description of the Related Art

In recent years, digital contents, such as images and moving images, can be easily created or acquired by an individual, and as a consequence, a large number of contents are managed in an information processing apparatus by the individual.

In general, information processing apparatuses include one configured to display a large number of contents as one page when a user views a desired content, and display the content desired by the user in a display area on a screen by page scrolling. On the other hand, there has been proposed an information processing apparatus configured to divide, when displaying a large number of contents, the contents into a plurality of pages, and display the contents in a display area on a screen by switching between these pages (see e.g. Japanese Patent Laid-Open Publication No. 2008-176658).

Further, the conventional information processing apparatuses include one configured to always display, when displaying contents, a control for controlling the display of the contents to thereby improve the user-friendliness. As such an information processing apparatus, with a view to increasing the number of contents to be displayed, there has been proposed one configured to display controls indicating presence of contents which cannot be displayed, on a contents selection screen, in a manner superimposed on the contents (see e.g. Japanese Patent Laid-Open Publication No. 2007-157033).

By the way, when a large number of contents are displayed on one page without dividing the contents and a user attempts to change contents displayed in a display area on a screen by operating a scroll bar, the contents displayed in the display area on the screen are largely moved by just a slight operation on the scroll bar. Therefore, it is difficult to display a content desired by the user in the display area on the screen by page scrolling operation, and the user can reach a desired content only after page scrolling is performed many times.

On the other hand, Japanese Patent Laid-Open Publication No. 2008-176658 discloses a technique in which when a large number of contents are divided into a plurality of pages for display, the screen displays an indication that a page currently displayed on the screen is a partial image which belongs to a whole image including an image associated with a preceding or subsequent page.

However, according to the technique disclosed in Japanese Patent Laid-Open Publication No. 2008-176658, the page currently displayed on the screen is a partial image, and hence it is difficult for the user to perform an operation for display of images including an image before or after the currently displayed partial image in a manner such that continuity therebetween is maintained.

Further, according to the technique disclosed in Japanese Patent Laid-Open Publication No. 2008-176658, when the operation for switching between pages is performed, the displayed screen is switched to a next page, which makes it difficult for the user to recognize contents located in the vicinity of each page boundary.

Further, if a display item, such as a button or an icon, is always displayed as the control, the display area for displaying contents is inevitably reduced. On the other hand, as described in Japanese Patent Laid-Open Publication No. 2007-157033, when the control is displayed in a manner superimposed on the contents, it is difficult for the user to identify the contents.

To cope with the above-described problems, it is envisaged to divide a large number of contents into display sections partially overlapping each other, and display these display sections on the screen.

However, depending on the number of contents existing in each display section and the number of lines of contents displayed in the display area, a blank area in which no contents are displayed is sometimes produced in a starting column and a terminating column in the display section. Further, if such a blank area is produced, it is difficult for the user to recognize continuity of contents between the currently displayed display section and a preceding or following display section.

For example, if the terminating column is not filled with contents in the currently displayed display section despite the existence of a following display section, it is difficult for the user to suppose that the following display section exists. Therefore, the user may not perform an operation for switching the display to the following display section.

SUMMARY OF THE INVENTION

The present invention provides an information processing apparatus that is capable of displaying, when displaying a large number of contents by dividing the contents into a plurality of pages, contents of separate pages in a manner such that continuity between the separate pages is maintained, and what is more, capable of enabling a user to easily recognize contents located in the vicinity of each page boundary, a method of controlling the information processing apparatus, and a storage medium.

The present invention also provides an information processing apparatus that is capable of securing, when displaying a control, such as a button or an icon, together with contents, an area for displaying the contents, and what is more, capable of enabling easy identification of the contents, a method of controlling the information processing apparatus, and a storage medium.

The present invention further provides an information processing apparatus that is capable of displaying, when displaying a large number of contents by dividing the contents into a plurality of display sections, contents of separate pages in a manner such that continuity between the separate pages is maintained, and what is more, capable of enabling easy recognition of existence of a preceding or following display section, a method of controlling the information processing apparatus, and a storage medium.

In a first aspect of the present invention, there is provided an information processing apparatus that divides a plurality of contents into a plurality of successive display sections, and displays the contents on a display section-by-display section basis, comprising a selection unit configured to select and arrange the contents such that a plurality of contents selected as objects to be displayed are redundant between adjacent ones of the display sections at a predetermined ratio, and a display control unit configured to subject the contents to screen display in a display area, on a display section-by-display section basis.

In a second aspect of the present invention, there is provided an information processing apparatus that divides a plurality of contents into a plurality of successive display sections, and displays the contents on a display section-by-display section basis, comprising a selection unit configured to select and arrange the contents such that a plurality of contents selected as objects to be displayed are redundant between adjacent ones of the display sections at a predetermined ratio, a calculation unit configured to calculate a number of contents which can be displayed per one column in the display area, according to a size of a display area where the contents are to be displayed, and a display size of the contents, and a display control unit configured to, when displaying contents belonging to a selected one of the plurality of display sections, on the display area, in a case where there occurs a column having a smaller number of contents than the number of contents, cause contents which are to be displayed in the column not to be displayed, and the other contents to be displayed in the display area.

In a third aspect of the present invention, there is provided a method of controlling an information processing apparatus that divides a plurality of contents into a plurality of successive display sections, and displays the contents on a display section-by-display section, comprising selecting and arranging the contents such that a plurality of contents selected as objects to be displayed are redundant between adjacent ones of the display sections at a predetermined ratio, and subjecting the contents to screen display in a display area on a display section-by-display section basis.

In a fourth aspect of the present invention, there is provided a non-transitory computer-readable storage medium storing a computer-executable control program for causing a computer to execute a method of controlling an information processing apparatus that divides a plurality of contents into a plurality of successive display sections, and displays the contents on a display section-by-display section, wherein the method comprises selecting and arranging the contents such that a plurality of contents selected as objects to be displayed are redundant between adjacent ones of the display sections at a predetermined ratio, and subjecting the contents to screen display in a display area on a display section-by-display section basis.

In a fifth aspect of the present invention, there is provided a method of controlling an information processing apparatus that that divides a plurality of contents into a plurality of successive display sections, and displays the contents on a display section-by-display section basis, comprising selecting and arranging the contents such that a plurality of contents selected as objects to be displayed are redundant between adjacent ones of the display sections at a predetermined ratio, calculating a number of contents which can be displayed per one column in the display area, according to a size of a display area where the contents are to be displayed, and a display size of the contents, and causing, when displaying contents belonging to a selected one of the plurality of display sections, on the display area, in a case where there occurs a column having a smaller number of contents than the number of contents, contents which are to be displayed in the column not to be displayed, and the other contents to be displayed in the display area.

In a sixth aspect of the present invention, there is provided a non-transitory computer-readable storage medium storing a computer-executable control program for causing a computer to execute a method of controlling an information processing apparatus that that divides a plurality of contents into a plurality of successive display sections, and displays the contents on a display section-by-display section basis, wherein the method comprises selecting and arranging the contents such that a plurality of contents selected as objects to be displayed are redundant between adjacent ones of the display sections at a predetermined ratio, calculating a number of contents which can be displayed per one column in the display area, according to a size of a display area where the contents are to be displayed, and a display size of the contents, and causing, when displaying contents belonging to a selected one of the plurality of display sections, on the display area, in a case where there occurs a column having a smaller number of contents than the number of contents, contents which are to be displayed in the column not to be displayed, and the other contents to be displayed in the display area.

According to the present invention, when displaying a plurality of contents by dividing the contents into a plurality of display sections (e.g. pages), it is possible to display the contents in a manner such that continuity between the display sections is maintained, and what is more, capable of enabling the user to easily recognize contents located in the vicinity of each boundary between separate display sections.

Further, according to the present invention, when displaying instruction input information, such as a button or an icon, together with contents, it is possible to secure an area for displaying the contents, and what is more, enable easy identification of the contents.

According to the present invention, when displaying a large number of contents by dividing the contents into a plurality of display sections, it is possible to display contents in a manner such that continuity between the display sections is maintained, and what is more, enable easy recognition of existence of a preceding or following display section.

Further features of the present invention will become apparent from the following description of exemplary embodiments with reference to the attached drawings.

BRIEF DESCRIPTION OF THE DRAWINGS

FIG. 5 is a flowchart of a display control process executed, when switching between display sections, by the information processing apparatus according to the second embodiment.

FIGS. 6A to 6E are views useful in explaining display of contents in display sections, which is performed by an information processing apparatus according to a third embodiment of the present invention, in which FIG. 6A shows a state of a display area at a time when a first display section has been scrolled to a starting end thereof, FIG. 6B shows a state of the display area at a time when a content display position in the first display section has been changed halfway by operating a scroll bar, FIG. 6C shows a state of the display area at a time when a last display section has been scrolled to a terminating end thereof, FIG. 6D shows a state of the display area at a time when a display section has been scrolled to a terminating end thereof in a case where a following display section exists, and FIG. 6E shows a state of the display area at a time when a display section has been scrolled to a starting end thereof in a case where a preceding display section exists.

FIGS. 9A and 9B are views showing contents at respective designated positions, displayed by the information processing apparatus according to the fourth embodiment, in which FIG. 9A shows a display of contents at a first designated position shown in FIG. 8, and FIG. 9B shows a display of contents at a second designated position shown in FIG. 8.

FIGS. 10A and 10B are views showing contents at designated positions for comparison with those shown in FIGS. 9A and 9B, in which FIG. 10A shows a display of contents at the first designated position shown in FIG. 8, and FIG. 10B shows a display of contents at the second designated position shown in FIG. 8.

FIGS. 12A and 12B are diagrams useful in explaining selection of a display section, which is performed by the information processing apparatus according to the fourth embodiment, in which FIG. 12A shows selection of a display section in a case where the number of contents is 2500, and FIG. 12B shows selection of a display section in a case where the number of contents is 2501.

FIGS. 15A to 15H are views useful in explaining switching between display sections appearing in FIG. 14, in which FIG. 15A shows a display of a first display section, FIG. 15B shows a display of the first display section in which a blank space is coped with, FIG. 15C shows a display of a second display section, FIG. 15D shows a display of the second display section in which a blank space is coped with, FIG. 15E shows a display of a third display section, FIG. 15F shows a display of the third display section in which blank spaces are coped with, FIG. 15G shows a display of a fourth display section, and FIG. 15H shows a display of the fourth display section in which a blank space is coped with.

FIG. 16 is a flowchart of a process for displaying contents, which is executed by the information processing apparatus shown in FIG. 1.

DESCRIPTION OF THE EMBODIMENTS

The present invention will now be described in detail below with reference to the accompanying drawings showing embodiments thereof.

Figure 1:
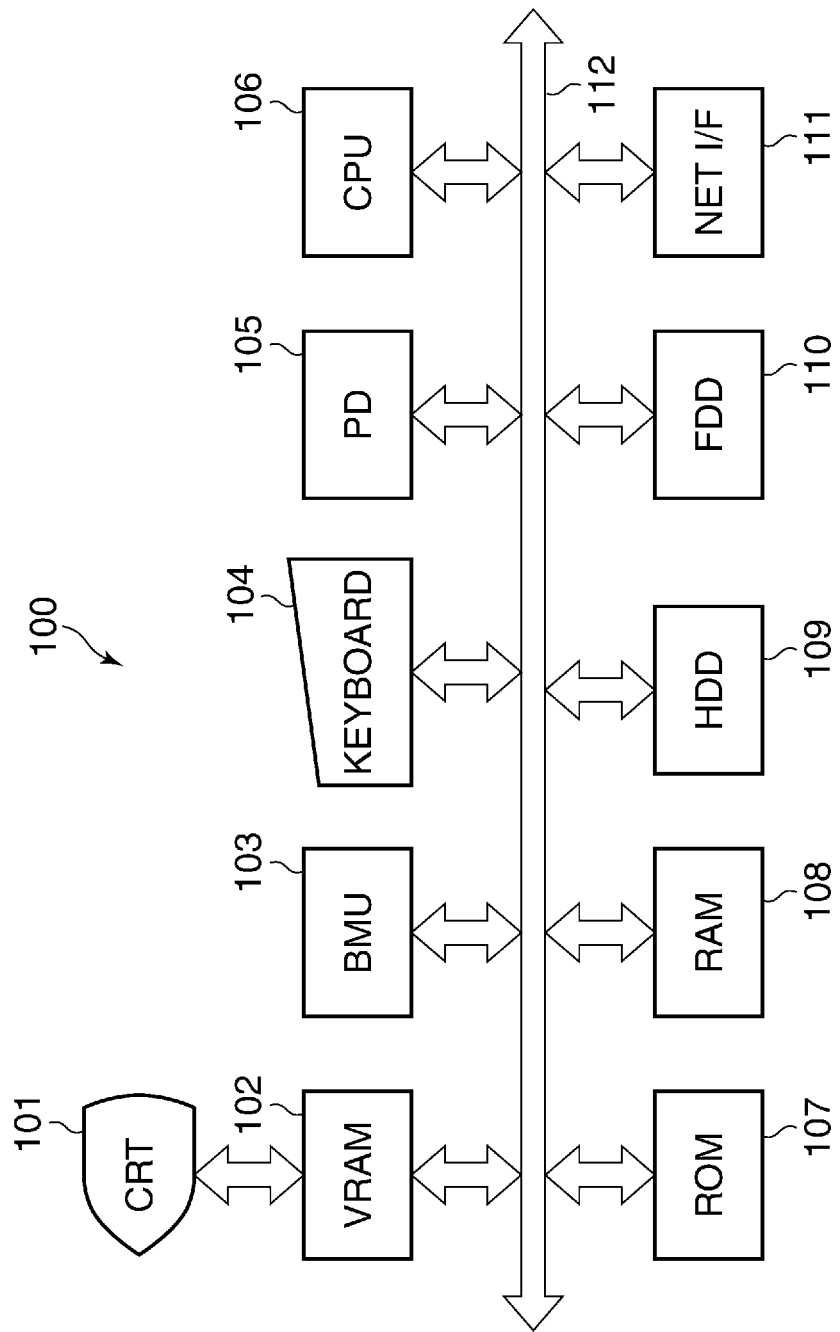
FIG. 1 is a block diagram of an information processing apparatus according to a first embodiment of the present invention.

FIG. 1 is a block diagram of an example of an information processing apparatus according to a first embodiment of the present invention.

In FIG. 1, the information processing apparatus, denoted by reference numeral 100, includes a display 101, a VRAM (video memory) 102, a bit move unit (BMU) 103, a keyboard 104, a pointing device (PD) 105, a CPU 106, a ROM 107, a RAM 108, a HDD (hard disk drive) 109, a FDD (flexible disk drive) 110, and a network interface (NET I/F) 111. The information processing apparatus 100 may be realized by a single computer, or may be realized by a plurality of computers to which required functions are distributed. In a case where the information processing apparatus 100 is formed by a plurality of computers, the computers are connected by wired communication, such as a local area network (LAN) or the Internet, or wireless communication, such as a wireless LAN or Bluetooth, such that the computers are capable of communicating with each other.

The display 101 displays e.g. a list of contents, which are image data, editing information, icons, messages, a menu, and user interface information, under the control of the CPU 106 via the VRAM 102. Image data to be displayed on the display 101 is written in the VRAM 102.

The image data written in the VRAM 102 is transferred to the display 101 according to a predetermined rule under the control of the CPU 106, whereby an image based on the transferred image data is displayed on the display 101.

The bit move unit 103 controls e.g. data transfer between memories (e.g. between the VRAM 102 and another memory), and data transfer between a memory and each I/O device (e.g. the network interface 111) under the control of the CPU 106. The keyboard 104 is used for inputting document data, such as characters, and includes various keys.

The pointing device 105 is used for pointing to e.g. an icon, a menu, or a like other item in contents displayed on the display 101. Further, the pointing device 105 is used for dragging and dropping an object selected thereby.

The CPU 106 controls the overall operation of the information processing apparatus according to control programs stored in the ROM 107, the HDD 109, or a flexible disk. The ROM 107 stores various control programs and data. The RAM 108 is used as a work area for the CPU 106, an area for saving data in error handling, an area for loading the control programs, and so on. The HDD 109 stores the control programs executed by the information processing apparatus, contents, and data.

The FDD 110 accesses a flexible disk typified by a floppy (registered trademark) under the control of the CPU 106. The network interface 111 performs communication with other information processing apparatuses (now shown) and a printer (not shown) under the control of the CPU 106 via a network.

The VRAM 102, the bit move unit 103, the keyboard 104, the pointing device 105, the CPU 106, the ROM 107, the RAM 108, the HDD 109, the FDD 110, and the network interface 111 are interconnected by a CPU bus 112, which includes an address bus, a data bus, and a control bus.

Further, to provide a control program to the CPU 106, the control program may be downloaded from another information processing apparatus via the network interface 111 through the network.

Figure 2:
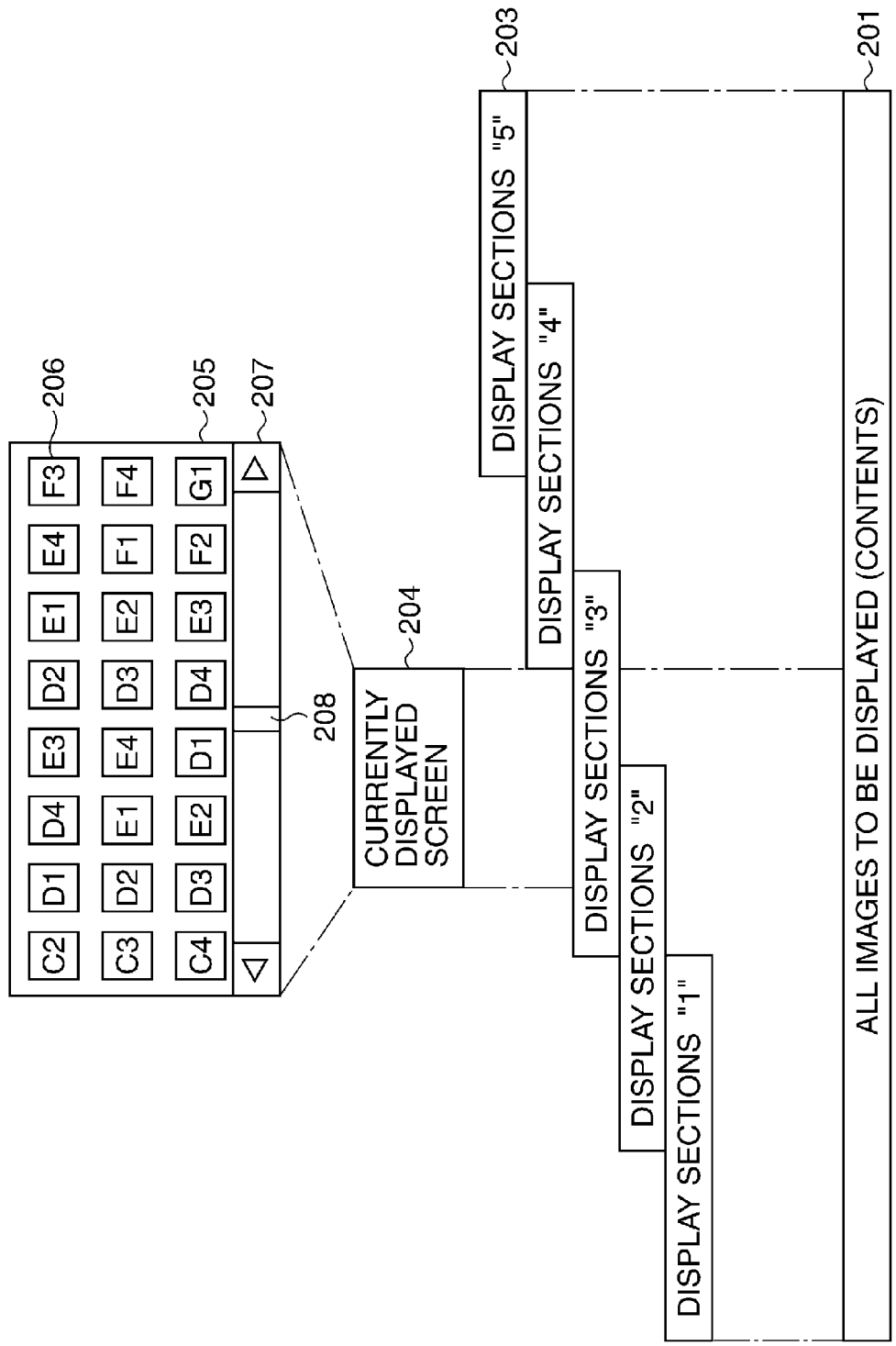
FIG. 2 is a diagram useful in explaining the concept of a method of displaying contents by the information processing apparatus shown in FIG. 1.

FIG. 2 is a diagram useful in explaining the concept of a method of displaying contents by the information processing apparatus 100.

In this method, when displaying a large number of contents, the large number of contents are divided into parts partially redundant between them, and each divided part is displayed as a display section. In the following description, a group of contents to be displayed is sometimes referred to as an image group.

Now, in the illustrated example, all images (content group) 201 as objects to be displayed are grouped into a plurality of display sections "1" to "5". The display section "1" partially overlaps the display section "2", and the display section "2" partially overlaps the display section "3". Further, the display section "3" partially overlaps the display section "4", and the display section "4" partially overlaps the display section "5". Thus, the contents are arranged in such a manner that contents are redundant between each adjacent pair of display sections.

Note that the content group 201 is e.g. a group of all contents in a specific folder selected by a user's operation.

The contents of the content group 201 are classified into the above-mentioned display sections "1" to "5" in a predetermined order based on attribute information thereof. The attribute information is e.g. a date and time of creation, a date and time of update, a file name, and a file size, of each content, and in the present embodiment, a descending or ascending order is employed as the predetermined order.

Each content is formed e.g. by an image file or a music file, and when a content is formed by an image file, the attribute information thereof includes a shooting date and time, a shooting location, a photographer's name, and a date and time at which the file is taken into the information processing apparatus.

As the user moves a knob 208 in a scroll bar 207, the CPU 106 scrolls one of the display sections "1" to "5". By this operation, it is possible to change the contents displayed on the screen, such that out of the contents belonging to the display section, part of a currently displayed content group disappears from the screen, and instead, contents not currently displayed come to be displayed on the screen. Note that the display section to be scrolled is switched according to the position of the knob 208 in the scroll bar 207 such that a display section is selected which includes all contents to be displayed as a content group 204, referred to hereinafter, on a display area 205, referred to hereinafter, and has a smaller display section number.

In FIG. 2, the content group (images) 204 currently displayed on the screen is redundantly allocated to the display sections "2" and "3" Further, on the display 101, the content group 204 is displayed in the display area 205. In the example illustrated in FIG. 2, part of contents in the display section "3" is displayed as the content group 204 on the display 101. The content group 204 displayed on the display 101 as part of the contents in the display section "3" is changed according to the movement of the knob 208 in the scroll bar 207.

The content group 204 contains a plurality of contents 206, and in a case where the content group 204 is formed by a plurality of image files, thumbnail images each showing the content of each image file are displayed as respective contents 206. Further, in a case where the content group 204 is formed by a plurality of music files, images each representing the content of an associated music file are displayed on the display 101 as respective contents 206. The illustrated example shows that a content 206 (F3) is contained in the content group 204, and is included in both of the display sections "2" and "3".

The following description is given of a case where the contents belonging to a display section are sequentially arranged in a predetermined number of rows in a direction of the column, and the contents displayed on the screen are changed by moving the scroll bar in a horizontal direction. However, this is not limitative, but the present invention can be also applied to a case where the contents belonging to a display section are sequentially arranged in a predetermined number of columns in a direction of the row, and the contents displayed on the screen are changed by moving the scroll bar in a vertical direction.

Figure 3:
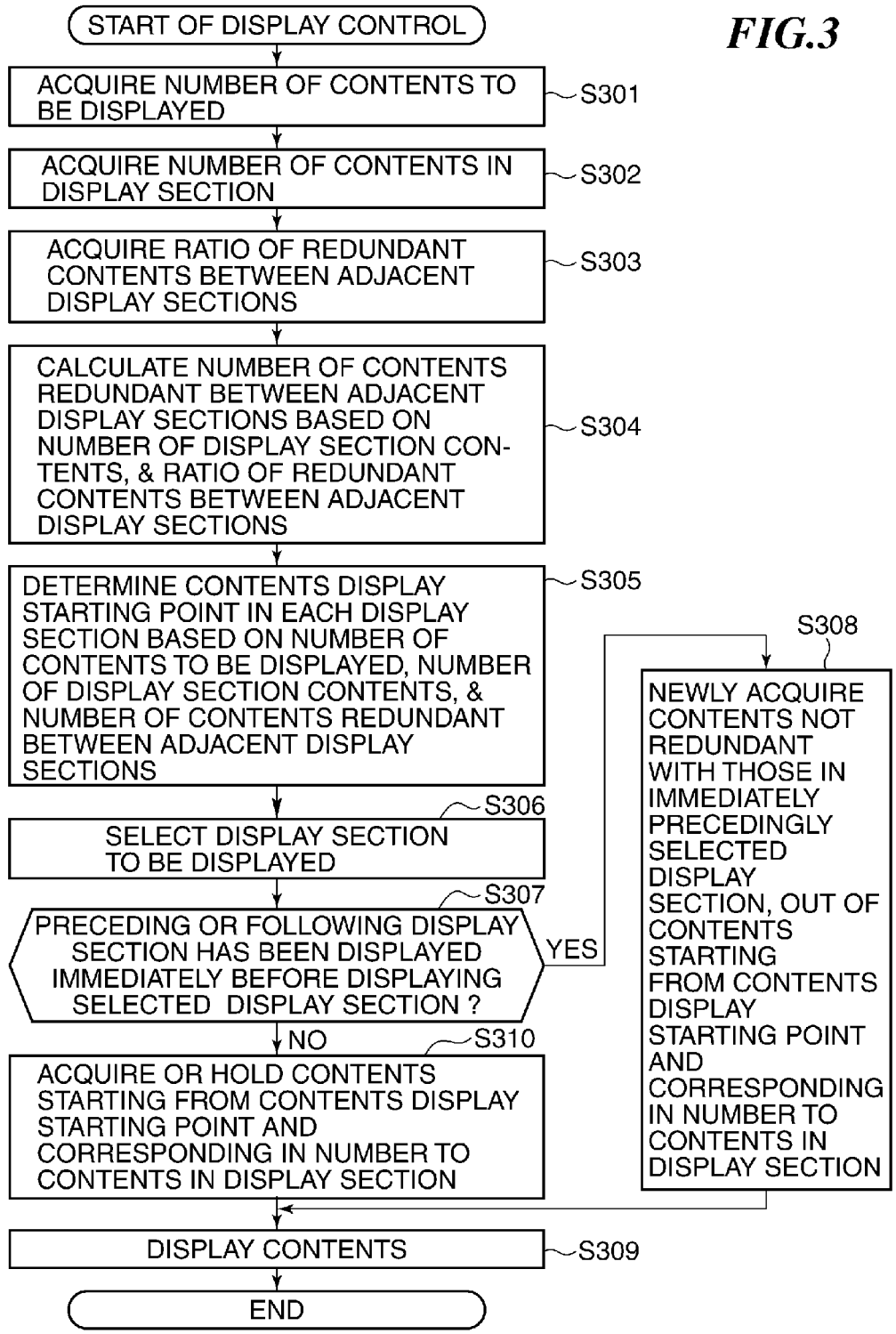
FIG. 3 is a flowchart of a display control process for displaying a list of contents, which is executed by the information processing apparatus shown in FIG. 1.

FIG. 3 is a flowchart of a display control process for displaying a list of contents, which is executed by the information processing apparatus 100. The display control process shown in FIG. 3 is executed by reading and starting a control program stored in the HDD 109, and controlling each of associated units by the CPU 106.

When a specific folder is selected by a user's operation, the CPU 106 acquires the number of all contents contained in the selected folder as the number of contents to be displayed (step S301). In the present embodiment, the number of contents to be displayed is the number of contents in the content group 201 appearing in FIG. 2.

Then, the CPU 106 acquires the number of contents in each display section from the HDD 109 (step S302). The number of contents in each display section (hereinafter referred to as the number of display section contents) is set and stored in the HDD 109 in advance. Note that the number of display section contents is the number of contents in each of the display sections "1" to "5" (i.e. in one display section) including overlapping portions appearing in FIG. 2.

Next, the CPU 106 acquires a ratio of a portion overlapping between adjacent display sections to each display section, in other words, a ratio of the number of contents redundant in the adjacent display sections to the number of display section contents (redundancy ratio), from the HDD 109 (step S303). The redundancy ratio is set and stored in the HDD 109 in advance.

Then, the CPU 106 calculates the number of contents redundant between adjacent display sections, according to the number of display section contents and the redundancy ratio (step S304). For example, assuming that the number of display section contents is 1000, and the redundancy ratio is 50%, the CPU 106 sets the number of contents redundant between the adjacent display sections to 500. If the number of contents redundant between the adjacent display sections is not an integer value, the CPU 106 rounds the value up or down to a whole number to thereby set the number of contents redundant between the adjacent display sections to an integer value. The number of contents redundant between the adjacent display sections is hereinafter referred to as the number of redundant contents.

Next, the CPU 106 determines a starting point of display of contents (hereinafter referred to as the contents display starting point) at the starting end of each of the display sections, according to the number of contents to be displayed, the number of display section contents, and the number of redundant contents (step S305). For example, assuming that the number of contents to be displayed is 3000, the number of display section contents is 1000, and the number of redundant contents is 500, the contents display starting point in the display section "1" appearing in FIG. 2 is the first content, and the contents display starting point in the display section "2" is the 501st content. Further, the contents display starting point in the display section "3" is the 1001st content, and the contents display starting point in the display section "4" is the 1501st content. Further, the contents display starting point in the display section "5" is the 2001st content.

Then, the CPU 106 selects a display section from which a content group is to be selected and displayed on the display area 205 and which is to be scrolled by a scroll operation (step S306). In doing this, the CPU 106 selects a display section to be scrolled according to a user's operation of moving the scroll bar. For example, if a content group in the display section "2" is currently selected by the user's operation of moving the scroll bar, the CPU 106 sets the display section "2" as the display section to be scrolled. Note that the display section to be selected is a display section which corresponds to the position of the knob 208 in the scroll bar 207, includes all contents to be displayed as the content group 204 on the display area 205, and has a smaller display section number. Accordingly, in the state shown in FIG. 2, the display section "3" is selected by the knob 208.

Note that as the display section to be scrolled first, the CPU 106 may select a display section including a content located at the center of all contents and having a smaller display section number. Further, the CPU 106 may store information on a display section having been selected at the termination of the display on the immediately preceding occasion, in the HDD 109, and initially select the display section on which the information is stored in the HDD 109, as the display section to be scrolled, for the display on the current occasion.

Next, the CPU 106 checks whether or not the display section selected immediately before the selection of the display section in the step S306 (hereinafter referred to as the selected display section) is a display section located before or after the selected display section (step S307). If a display section located before or after the selected display section was immediately precedingly selected (YES to the step S307), the CPU 106 newly acquires contents in the selected display section which are not redundant to those in the immediately precedingly selected display section, out of the contents corresponding in number to the number of display section contents starting from the contents display starting point, from the HDD 109, and hold as contents in the selected display section (step S308).

Then, out of the contents belonging to the selected display section in the display area 205, the CPU 106 displays contents in a range corresponding to the current position of the knob 208 in the scroll bar 207 (step S309).

That is, the CPU 106 switches from the immediately precedingly selected display section to the selected display section, and displays contents belonging to the selected display section in response to a subsequent operation of the knob 208 in the scroll bar 207.

On the other hand, if a display section located before or after the selected display section was not selected immediately precedingly (NO to the step S307), the CPU 106 acquires or holds contents corresponding in number to the number of display section contents starting from the contents display starting point of the selected display section, from the HDD 109, (step S310). Then, the CPU 106 proceeds to the step S309, wherein out of the contents belonging to the selected display section, the CPU 106 displays contents in the range corresponding to the current position of the knob 208 of the scroll bar 207 in the display area 205.

Note that the above-described operation of the information processing apparatus 100 may be realized by a plurality of computers. For example, the CPU 106 of a first computer executes the steps S301 to S306, and sends the contents belonging to the display section selected in the step S306 to a second computer. The second computer stores the contents belonging to the display section, which have been received from the first computer, in the HDD 109 thereof, in a manner associated with information for identifying the display section to which the stored contents belong. If a display section which was immediately precedingly selected exists, contents in the display section are already similarly stored in the HDD 109. Then, the CPU 106 of the second computer reads out contents from the HDD 109, and executes the steps S307 to S309.

Alternatively, the CPU 106 of the first computer executes the steps S301 to S306. The CPU 106 of the first computer receives information associated with the display section currently displayed on the display 101 of the second computer and the location of the knob 208 in the scroll bar 207 from the second computer in advance. Then, the CPU 106 of the first computer further executes not only the step S306 but also the steps 307, S308, and S310, according to the received information, and sends the contents acquired in the step S308 or S310 to the second computer. The CPU 106 of the second computer executes the step S309, and displays the contents received from the first computer on the display 101.

As described above, according to the first embodiment of the present invention, contents are allocated to adjacent display sections in a manner partially redundant therebetween, and contents in the selected display section are displayed in the display area 205 according to the scrolling operation. This enables the user to display contents located close to the boundary of the adjacent display sections by the scrolling operation in a manner such that continuity of contents is maintained.

Further, when switching between display sections, contents redundant at portions overlapping between the display sections are continuously displayed in a proper sequence, and hence the user is prevented from missing contents to which the user has been paying attention before switching between the display sections.

Next, a description will be given of an information processing apparatus according to a second embodiment of the present invention. The information processing apparatus according to the second embodiment has the same configuration as that of the information processing apparatus shown in FIG. 1, and the information processing apparatus according to the second embodiment is also configured to display contents within each display section for displaying objects to be displayed, in the display area, as described with reference to FIG. 2. Hereafter, in the second embodiment, the display of a content group by switching between display sections will be described.

Figure 4:
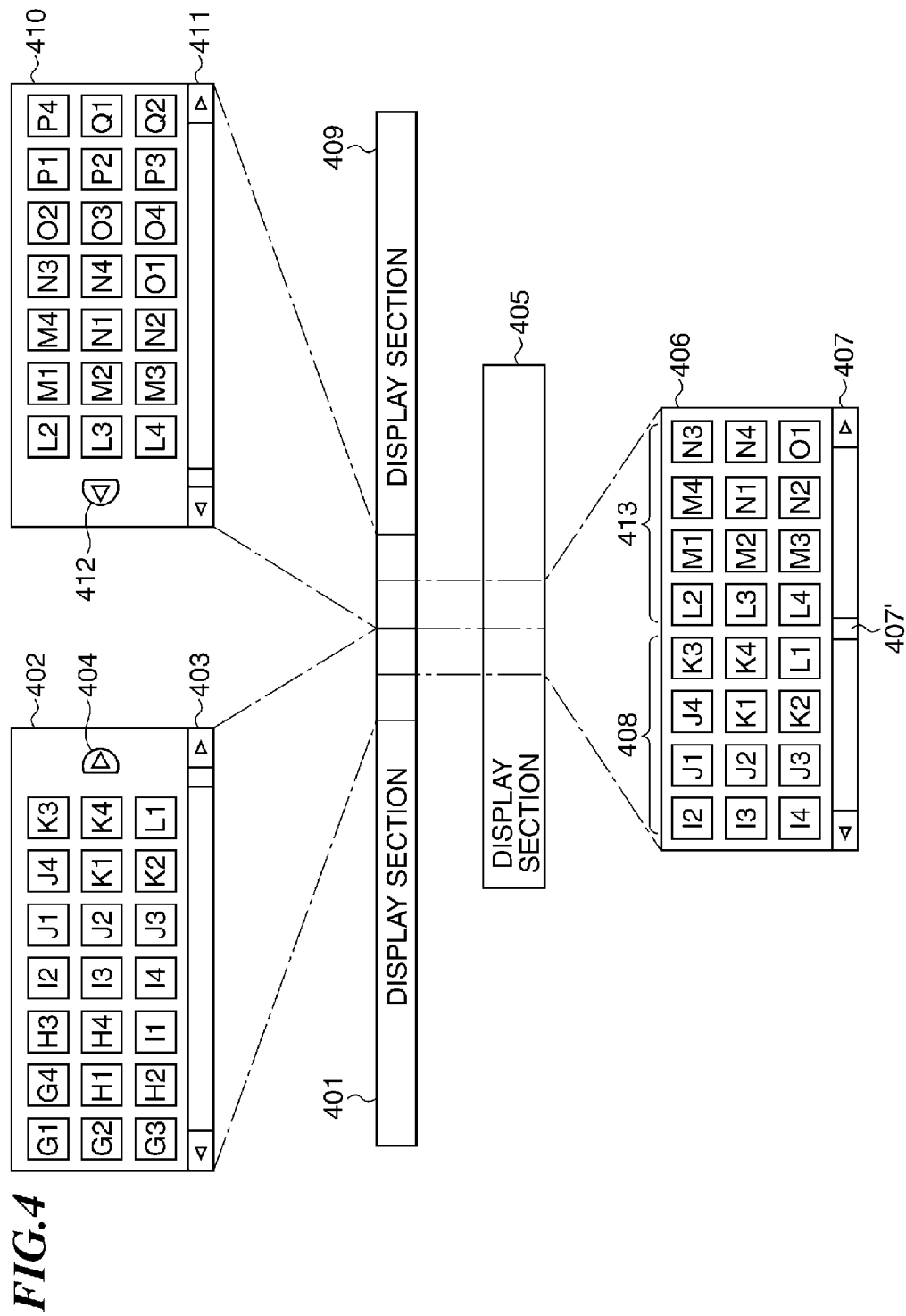
FIG. 4 is a diagram useful in explaining the concept of a method of switching between display sections, which is employed in an information processing apparatus according to a second embodiment of the present invention.

FIG. 4 is a diagram useful in explaining the concept of a method of switching between display sections by the information processing apparatus according to the second embodiment.

In FIG. 4, display sections 401, 405, and 409 are successive display sections, and the display sections 401 and 405 partially overlap, and the display sections 405 and 409 partially overlap. Further, each of the display sections 401, 405, and 409 contains content groups to be displayed. In the illustrated example, the display section 405 is the display section following the display section 401, and the display section 409 is the display section following the display section 405.

In FIG. 4, display areas 402, 406, and 410 are illustrated, and the display area 402 shows a state where a content group located at the terminating end of the display section 401 is displayed for convenience of description. In this state, contents G1 to L1 are displayed in the display area 402 as the content group.

The display area 406 shows a state of the display in a case where the display has been switched from the display section 401 to the following display section 405 or the display has been switched from the display section 409 to the preceding display section 405. In this state, contents I2 to O1 are displayed in the display area 406 as the content group.

The display area 410 shows a state where a content group located at the starting end of the display section 409 is displayed. In this state, contents L2 to Q2 are displayed in the display area 410 as the content group.

Scroll bars 403, 407, and 411 are displayed in the display areas 402, 406, and 410, respectively, and when the user operates the scroll bar 403, 407, or 411, the CPU 106 scrolls the content group displayed in the display area within the display section. This makes it possible to change the content group to be displayed in the display area. When the display section has been switched, the CPU 106 controls the scroll bar such that the contents to be displayed in the display area are changed.

Display section-switching buttons 404 and 412 are displayed in the display areas 402 and 410, respectively. The CPU 106 displays the display section-switching buttons 404 and 412 in the display areas 402 and 410, respectively, when the display section is scrolled to the starting end or terminating end thereof. Note that the CPU 106 displays the display section-switching buttons 404 and 412 only when a preceding or following display section exists.

Contents to be displayed after switching the display section are displayed in the display area 406. In the illustrated example, content groups 408 and 413 are displayed in the display area 406. In this example, contents I2 to L1 are displayed as the content group 408 in the display area 406. The contents I2 to L1 are also displayed in the display area 402, and the CPU 106 displays the contents I2 to L1 also in the display area 406 when the display section has been switched from the display section 401 to the display section 405.

Similarly, contents L2 to O1 are displayed in the display area 406 as the content group 413. The contents L2 to O1 are also displayed in the display area 410, and the CPU 106 displays the contents L2 to O1 also in the display area 406 when the display section has been switched from the display section 409 to the display section 405.

FIG. 5 is a flowchart of a display control process executed when switching between the display sections, by the information processing apparatus according to the second embodiment. The display control process shown in FIG. 5 is executed by the CPU 106 which reads out and starts a control program stored in the HDD 109, and controls associated units according to the control program.

When a specific folder is selected by a user's operation, the CPU 106 acquires the number of all contents in the selected folder as the number of contents to be displayed (step S501). Then, the CPU 106 acquires the number of display section contents aforementioned in the first embodiment from the HDD 109 (step S502). Next, the CPU 106 acquires a redundant contents number indicative of the number of contents redundant between each adjacent pair of display sections from the HDD 109 (step S503). The redundant contents number is stored in the HDD 109 in advance.

When the user operates the display section-switching button, the CPU 106 determines whether a display section to be displayed by switching between the display sections is one preceding the currently selected display section (selected display section) or one following the same (step S504). In this step, the CPU 106 determines which of the display section-switching buttons 404 or 412, shown in FIG. 4, has been operated.

If the display section is switched to the following one (following display section in the step S504), the CPU 106 acquires a position of a terminating end content of the display section displayed before the switching operation in all of contents as the objects to be displayed, from the HDD 109, as a position in the entire range (step S505). The position in the entire range is intended to mean a position of a content in a sequence of all the contents in the selected folder (objects to be displayed) arranged in a predetermined order (arranged from the starting end). Further, the end content is intended to mean one of contents belonging to each display section, which is located at the terminating end of the display section.

In this step, assuming that the number of display section contents acquired in the step S502 is 100, the redundant contents number acquired in the step S503 is 50, and the display section 401 shown in FIG. 4 is the first display section, a numerical value corresponding to the position of the terminating end content in the display section 401 in the entire range is 100. Therefore, in the display section 401, the content L1 displayed at the end of the display area 402 (lower right end) is the terminating end content.

Next, the CPU 106 determines the number of contents to remain displayed in the display area after switching of the display sections (step S506). Now, assuming that the number of columns in the content group displayed in the display area before the switching operation is n, and the number of rows in the same content group is m, the number C of contents to remain displayed in the display area in the display area is calculated by one of the following equations (1) and (2):

$$C = n/2 \times m \quad (1)$$

in a case where the number of columns n is an even number, and $$C = (n+1)/2 \times m \quad (2)$$

in a case where the number of columns n is an odd number.

The display area 402 shown in FIG. 4 has 7 columns and 3 rows, and hence the CPU 106 obtains the number C of contents to remain displayed in the display area (=12) by the equation (2). As a result, 12 contents including the terminating end content L1 are set to the contents to remain displayed in the display area.

Then, the CPU 106 determines a first displayed content which is displayed in the display area after switching of the display sections according to the position of the terminating end content in the entire range and the number of contents to remain displayed in the display area (step S507). In the present embodiment, the first displayed content is intended to mean a content displayed at the starting end (upper left corner) of the display area.

Now, assuming that the terminating end content is an x-th content in the entire range, and the number of contents to remain displayed in the display area is equal to y, a numerical value corresponding to a position P of the first displayed content in the entire range is calculated by the following equation (3):

$$P = x - y + 1 \quad (3)$$

This makes it possible to identify the first displayed content.

For example, in the display area 402, assuming that the terminating end content is the 100th content in the entire range (x=100), since the value of 12 has been obtained as the number of contents to remain displayed in the display area (y=12), 100−12+1=89 is obtained from the equation (3). That is, the content I2 as the 89th content is determined to be the first displayed content in the display area after switching of the display sections. Then, the CPU 106 proceeds to a step S511, referred to hereinafter.

If the display section is switched to the preceding one (preceding display section in the step S504), the CPU 106 acquires a position of a starting end content in the display section displayed before the switching operation in the entire range (step S508). In the present embodiment, the starting end content is intended to mean one of contents belonging to each display section, which is located at the starting end of the display section.

For example, assuming that the number of display section contents acquired in the step S502 is 100, the redundant contents number acquired in the step S503 is 50, and the display section 409 is the third display section, the starting end content is the 101st content in the entire range. In the display section 409 appearing in FIG. 4, the content L2 displayed at the starting end (upper left corner) of the display area 410 is the starting end content.

Then, the CPU 106 determines the number of contents to remain displayed in the display area after switching of the display sections (step S509). In the step S509, the number of contents to remain displayed in the display area is calculated by the above equation (1) or (2).

The content group displayed in the display area 410 appearing in FIG. 4 has 7 columns and 3 rows, and hence a value of 12 is obtained as the number of contents to remain displayed in the display area. As a result, 12 contents including the first content L2 remain displayed in the display area.

Next, the CPU 106 determines the first displayed content in the display area after switching of the display sections according to the position of the starting end content in the entire range and the number of contents to remain displayed in the display area (step S510).

Now, assuming that the starting end content is an x-th content in the entire range, and the number of contents to remain displayed is y, a numerical value corresponding to the position P of the first displayed content in the display area after switching of the display sections is obtained by the following equation (4):

$$P = x - y \quad (4)$$

Thus, the first displayed content is identified.

For example, in the display area 410, assuming that the starting end content is the 101st content in the entire range, the position of the first displayed content is obtained by 101−12=89. As a result, the content I2 as the 89th content in the entire range is determined to be the first displayed content in the display area after switching between the display sections.

Then, the CPU 106 compares the redundant contents number between each adjacent pair of display sections and the number of contents to remain displayed in the display area to determine whether or not the redundant contents number<the number of contents to remain displayed in the display area holds (step S511). If the redundant contents number<the number of contents to remain displayed in the display area holds (YES to the step S511), the first displayed content determined in the step S507 or S510 does not belong to the switched display section, and hence the CPU 106 sets the starting end content in the display section as the first displayed content in the display area (step S512).

For example, assuming that the number of contents acquired in the step S502 is 100, and the redundant contents number acquired in the step S503 is set to 10, the 1st to 100th contents in the entire range belong to the display section 401, and the 91st to 190th contents in the entire range belong to the display section 405. Therefore, when the display section is switched from the display section 401 to the display section 405, the CPU 106 sets the 91st content in the entire range as the first displayed content.

Then, the CPU 106 acquires contents to be displayed after switching of the display sections from all contents (step S513). Note that if the redundant contents number is not less than the number of contents to remain displayed (NO to the step S511), the CPU 106 directly proceeds to the step S513.

Next, the CPU 106 determines a horizontal width of the display section according to the number of contents, a contents display size (size of the display area), and the number of rows in the display area. Then, the CPU 106 arranges the content group acquired in the step S513 in a predetermined order (step S514). Then, the CPU 106 determines a range within the display section such that the first displayed content determined as above is displayed at the starting end (upper left corner) of the display area, and generates display screen data such that the contents arranged in the determined range are displayed in the display area, and the scroll bar is moved in a manner corresponding to a position of the range within the display section displayed in the display area (step S515). The CPU 106 causes the display screen data generated in the step S515 to be displayed on the display 101 (step S516).

In the present embodiment, whichever of the display sections 401 and 409 may be a display section displayed before the switching operation, in the display area 406 displayed after being switched to the display section 405, the position of a knob 407' in the scroll bar 407 is adjusted such that the content I2 is displayed at the starting end of the display area 406.

Note that the equation used e.g. in the step S506 is provided only by way of example, and by changing the equation, it is possible to change the number of contents to remain displayed after the switching operation.

Note that the above-described operation of the information processing apparatus 100 may be realized by a plurality of computers. For example, the CPU 106 of the first computer may execute the steps S501 to S513, and send the contents acquired in the step S513 to the second computer. The CPU 106 of the second computer may store the contents received from the first computer in the HDD 109 in a manner associated with information for identifying the display section to which the stored contents belong. Note that contents in the currently selected display section are similarly already stored in the HDD 109. Then, the CPU 106 of the second computer may read out the contents from the HDD 109, and execute the steps S514 and S515. It is assumed here that the first computer has already received information on the display section currently selected by the second computer and the position of the knob in the scroll bar from the second computer in advance. Further, it is only required for the CPU 106 of the second computer to detect the user's operation of the display section-switching button in the step S504, and notify a result of detection to the first computer.

Alternatively, the CPU 106 of the first computer may execute the steps S514 and S515 as well, and transmit the display screen data generated in the step S515 to the second computer. The CPU 106 of the second computer may execute the step S516, and display the display screen data received from the first computer on the display 101.

As described above, in the second embodiment of the present invention, when switching between adjacent display sections, part of the content group displayed in the display area is caused to remain displayed on the display area after the switching operation depending on a direction of switching of the display section, and hence the user can easily recognize that the display section has been switched, without missing the contents to which the user has been paying attention before the switching operation.

Further, part of the content group is caused to remain displayed in the display area depending on the direction of switching of the display section (forward or backward), and hence the user is not required to perform an additional scrolling operation.

Next, a description will be given of an information processing apparatus according to a third embodiment of the present invention. The information processing apparatus according to the third embodiment has the same configuration as that of the information processing apparatus shown in FIG. 1, and the information processing apparatus according to the third embodiment is also configured to display contents within each display section for displaying objects to be displayed, in the display area, as described with reference to FIG. 2. Hereafter, the display of contents in the display section by the image processing apparatus according to the third embodiment will be described.

Figure 6A:
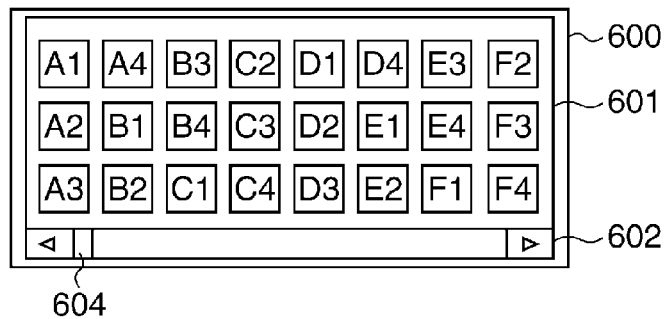
Figure 6B:
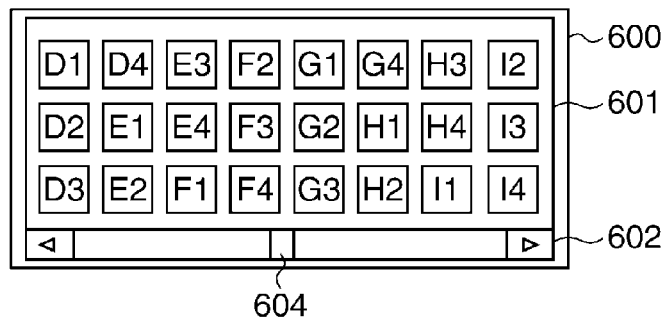
Figure 6C:
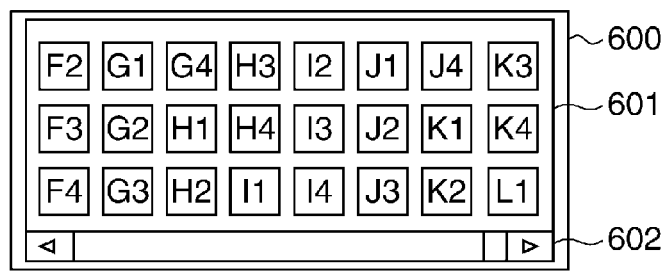
Figure 6D:
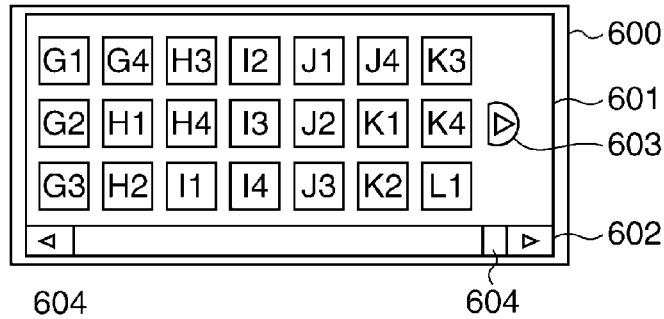
Figure 6E:
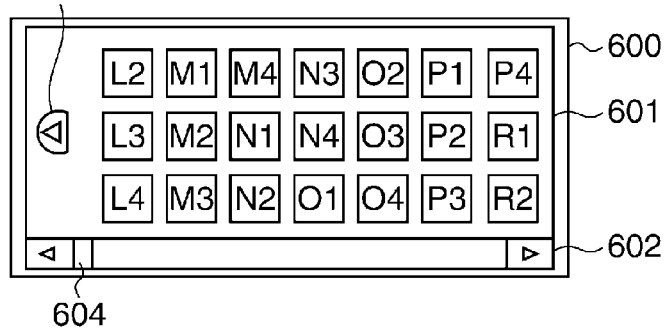

FIGS. 6A to 6E are views useful in explaining the display of contents in the display sections performed by the information processing apparatus according to the third embodiment, in which FIG. 6A shows a state of the display area at a time when a first display section has been scrolled to a starting end thereof, FIG. 6B shows a state of the display area at a time when a content display position in the display section has been changed halfway by operating a scroll bar, FIG. 6C shows a state of the display area at a time when a last display section has been scrolled to a terminating end thereof, FIG. 6D shows a state of the display area at a time when a display section has been scrolled to a terminating end thereof in a case where a following display section exists, and FIG. 6E shows a state of a display area at a time when a display section thereof has been scrolled to a starting end thereof in a case where a preceding display section exists.

In FIG. 6A, a screen 600 is displayed on the display 101, and a display area 601 for displaying the contents is defined on the screen 600. A scroll bar 602 is displayed on the screen 600, and a position of a content group displayed in the display area 601 within the display section is indicated by a knob 604 in the scroll bar 602. Further, when the knob 604 in the scroll bar 602 is moved according to a user's operation, contents which are not currently displayed come to be newly displayed in the display area 601, and from the currently displayed contents, a number of contents corresponding in number to the contents to be newly displayed cease to be displayed, whereby it is possible to change the contents displayed in the display area 601.

In FIG. 6D, a display section-switching button 603 for switching the display section to a following display section is displayed in the display area 601. Further, in FIG. 6E, a display section-switching button 604 for switching the display section to a preceding display section is displayed in the display area 601. Note that although in the illustrated examples in FIGS. 6D and 6E, the display section-switching buttons 603 and 604 are displayed in the display area 601, icons or images may be displayed as instruction input tools in place of the buttons, insofar as they can be used for performing switching control.

As shown in FIG. 6A, the first display section (e.g. the display section "1" appearing in FIG. 2) is scrolled to the starting end thereof. In this case, there is no display section before the first display section, and hence the display section-switching button 604 is not displayed in the display area 601. That is, only contents are displayed in the display area 601.

As shown in FIG. 6B, the content display position in the display section is changed halfway by the scroll bar 602. In this case, an intermediate portion in the display section is displayed, and hence the display section-switching buttons 603 and 604 are not displayed. That is, only contents are displayed in the display area 601 irrespective of existence of a display section before or after the currently selected display section, unless the display section is scrolled to the starting end or terminating end thereof.

As shown in FIG. 6C, the last display section (e.g. the display section "5" appearing in FIG. 2) is scrolled to the terminating end thereof. In this case, no display section exists after the last display section, and hence the display section-switching button 603 is not displayed, and only contents are displayed in the display area 601.

As shown in FIG. 6D, a display section having a following display section (e.g. the display section "1", "2", "3", or "4" appearing in FIG. 2) is scrolled to the terminating end thereof. In this case, since there is a display section following the scrolled display section, the display section-switching button 603 and contents are displayed in the display area 601.

As shown in FIG. 6E, a display section having a preceding display section (e.g. the display section "2", "3", "4", or "5" appearing in FIG. 2) is scrolled to the starting end thereof. In this case, since there is a display section preceding the scrolled display section, the display section-switching button 604 and contents are displayed in the display area 601.

Figure 7:
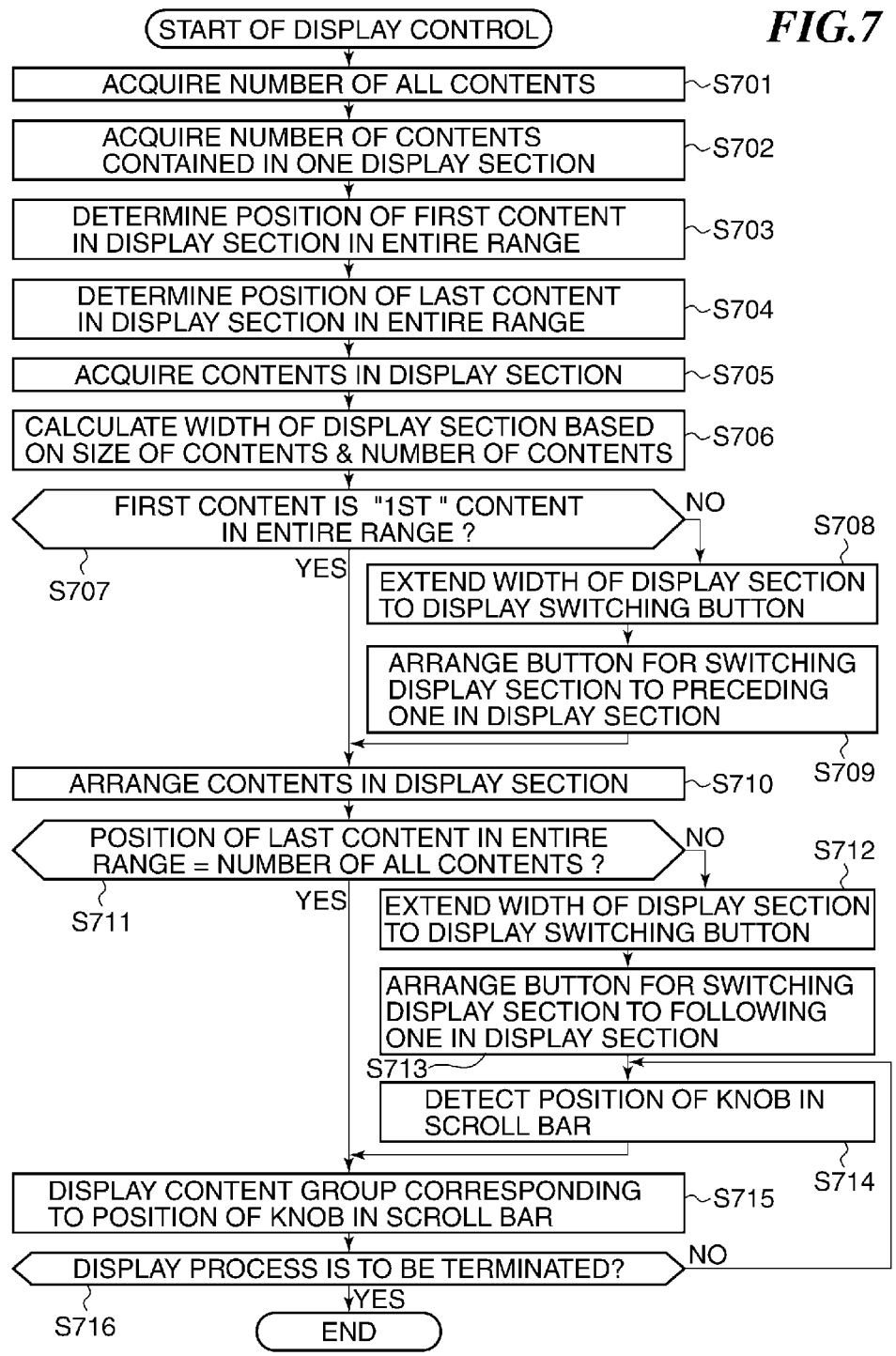
FIG. 7 is a flowchart of a display control process executed by the information processing apparatus according to the third embodiment.

FIG. 7 is a flowchart of a display control process executed by the information processing apparatus according to the third embodiment. The display control process shown in FIG. 7 is executed by the CPU 106 which reads out and starts a control program stored in the HDD 109, and controls associated units according to the control program.

When the information processing apparatus 100 is started, and a specific folder is selected by a user's operation, the CPU 106 acquires the number of all contents in the selected folder as the number of contents to be displayed (step S701). Then, the CPU 106 acquires the number of display section contents from the HDD 109 (step S702). The number of display section contents is e.g. the number of contents contained in one of display sections 203 appearing in FIG. 2, described in the first embodiment.

Then, the CPU 106 determines a position of the first content in the display section to be scrolled, in the entire range (step S703). For example, assuming that the number of contents acquired in the step S702 is 100, and the redundant contents number is 50, a numerical value corresponding to the position of the first content in the display section "2" appearing in FIG. 2 in the entire range is 51.

Next, the CPU 106 determines a position of the last content in the display section to be scrolled, in the entire range (step S704). For example, assuming that the number of contents acquired in the step S702 is 100, and the redundant contents number is 50, a numerical value corresponding to the position of the last content in the display section "2" appearing in FIG. 2 in the entire range is 150.

Then, the CPU 106 acquires the contents belonging to the display section to be scrolled, from the HDD 109 (step S705). In this step, the CPU 106 acquires, out of all contents, contents starting from the position of the first content in the display section to be scrolled (selected display section) in the entire range and corresponding in number to the number of display section contents. For example, when the display section to be scrolled is the display section "2" appearing in FIG. 2, the CPU 106 acquires the 51st to 150th contents in the entire range.

Next, the CPU 106 determines the horizontal width of a display section to be scrolled, according to the content display size (size of the display area), the number of contents, and the number of rows in the display area (step S706). Then, the CPU 106 determines whether or not a numerical number corresponding to the first content determined in the step S703 in the entire range is 1 (step S707).

If the numerical number corresponding to the first content in the entire range is not 1 (NO to the step S707), the CPU 106 adds a width corresponding to an area for displaying the display section-switching button 604 to the horizontal width of the display section, determined in the step S706. That is, the CPU 106 extends the width of the display section so as to display the display section-switching button 604 as required (step S708).

Thereafter, the CPU 106 disposes the display section-switching button 604 indicative of existence of a preceding display section at the starting end of the display section (step S709: see FIG. 6E). Then, the CPU 106 arranges the contents acquired in the step S705 in a predetermined order (step S710). Note that if the numerical value corresponding to the position of the first content in the entire range is 1 (YES to the step S707), the CPU 106 determines the display section as the first display section (the display section "1" in the illustrated example in FIG. 2), and directly proceeds to the step S710. In the step S710, if the display section-switching button 604 has been arranged, the CPU 106 arranges the contents after the display section-switching button 604, whereas if the display section-switching button 604 has not been disposed, the CPU 106 arranges the contents from the starting end of the display area 601.

Then, the CPU 106 determines whether or not a numerical value corresponding to the position of the last content determined in the step S704 in the entire range is equal to the number of all contents acquired in the step S701 (step S711). If the numerical value corresponding to the position of the last content is not equal to the number of all contents (NO to the step S711), the CPU 106 adds a width corresponding to an area for displaying the display section-switching button 603 to the width of the display section. That is, the CPU 106 extends the width of the display section so as to display the display section-switching button 603 as required (step S712).

Next, the CPU 106 arranges the display section-switching button 603 after the contents, which indicates existence of a following display section (step S713). Then, the CPU 106 detects the position of the scroll bar 602 (step S714). The CPU 106 displays contents in the display section included in the range corresponding to the position of the scroll bar 602, in the display area 601 (step S715). That is, the CPU 106 performs the display control according to the position of the knob in the scroll bar which has been moved by the user's operation. Note that when the scroll bar 602 reaches a position at which the starting end or terminating end content in the display section is displayed, the display section-switching button 603 or 604 is displayed in the display area 601. Then, the CPU 106 determines whether or not to terminate the process for displaying the current display section (step S716), and if it is determined that the process is to be terminated (YES to the step S716), the CPU 106 terminates the present process. On the other hand, if it is determined that the process is not to be terminated (NO to the step S716), the CPU 106 returns to the step S714.

Note that if the numerical value corresponding to the position of the last content in the entire range is equal to the number of all contents (YES to the step S711), the CPU 106 judges that the display section is the last display section (the display section "5" in the illustrated example in FIG. 2), and directly proceeds to the step S714.

In the present embodiment, if the display section-switching button 603 or 604 is disposed in the range corresponding to the position of the knob 604 in the scroll bar 602, the CPU 106 displays the display section-switching button 603 or 604 in the display area 601. Then, when an operation of clicking the display section-switching button 603 or 604 by the user is detected, the CPU 106 changes the display section to be scrolled, and starts the step S701.

Note that the above-described operation of the information processing apparatus 100 may be realized by a plurality of computers. For example, the CPU 106 of the first computer may execute the steps S701 to S705, and sends the contents acquired in the step S705 to the second computer. The CPU 106 of the second computer may store the contents received from the first computer in the HDD 109 in a manner associated with information for identifying the display section to which the stored contents belong. Note that contents in the currently selected display section are similarly already stored in the HDD 109. Then, the CPU 106 of the second computer may read out the contents from the HDD 109, and execute the steps S706 to S716. It is assumed here that the first computer has already received information on the display section currently selected by the second computer and the position of the knob in the scroll bar from the second computer in advance.

Alternatively, the CPU 106 of the first computer may further execute the steps S706 and S715, and the first computer may generate display screen data including the display area and the display section-switching button 603 or 604 in the step S715, and send the generated display screen data to the second computer. The CPU 106 of the second computer may execute the display processing in the step S715 to display the display screen data received from the first computer on the display 101.

As described above, in the third embodiment of the present invention, the display section-switching button is displayed in the range corresponding to the position of the knob in the scroll bar, and hence the user can very easily switch between the display sections.

Next, a description will be given of an information processing apparatus according to a fourth embodiment of the present invention. The information processing apparatus according to the fourth embodiment has the same configuration as that of the information processing apparatus shown in FIG. 1, and the information processing apparatus according to the fourth embodiment is also configured to display contents within each display section for displaying objects to be displayed, in the display area, as described with reference to FIG. 2. Hereafter, the display of contents in the display section in the fourth embodiment will be described.

Figure 8:
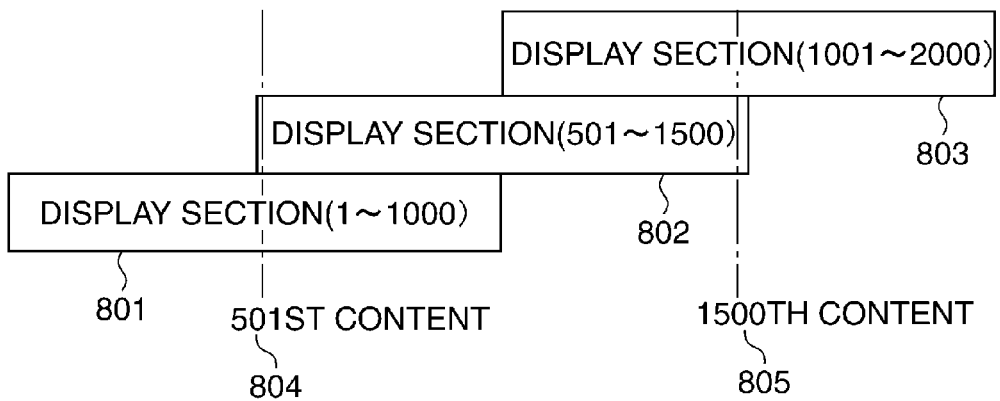
FIG. 8 is a diagram showing designated positions and overlapping display sections in the display control executed by an information processing apparatus according to a fourth embodiment of the present invention.

FIG. 8 is a diagram showing designated positions and overlapping display sections in the display control executed by the information processing apparatus according to the fourth embodiment.

In FIG. 8, 1st to 1000th contents belong to a display section 801. Further, 501st to 1500th contents belong to a display section 802. Similarly, 1001st to 2000th contents belong to a display section 803. In FIG. 8, the 501st content corresponds to a designated position (first designated position) 804. As shown in FIG. 8, the designated position 804 belongs to both of the display sections 801 and 802. Further, the 1500th content corresponds to a designated position (second designated position) 805. As shown in FIG. 8, the designated position 805 belongs to both of the display sections 802 and 803.

Here, the display of contents at a designated position will be described. The description will be given while comparing with the conventional example for ease of understanding the fourth embodiment.

Figure 9A:
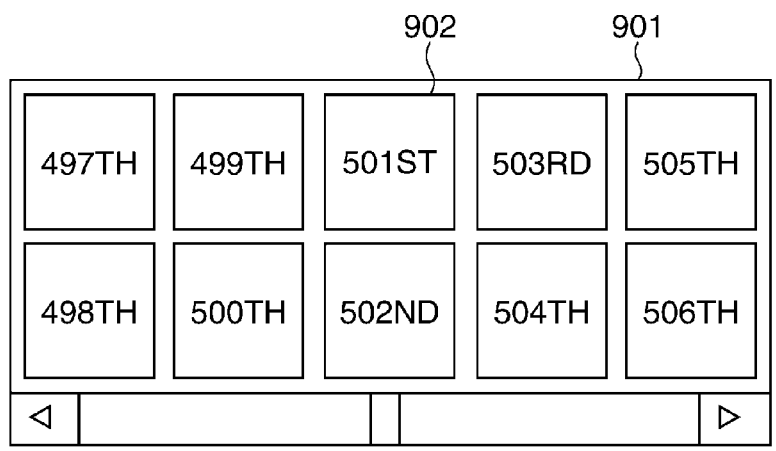
Figure 9B:
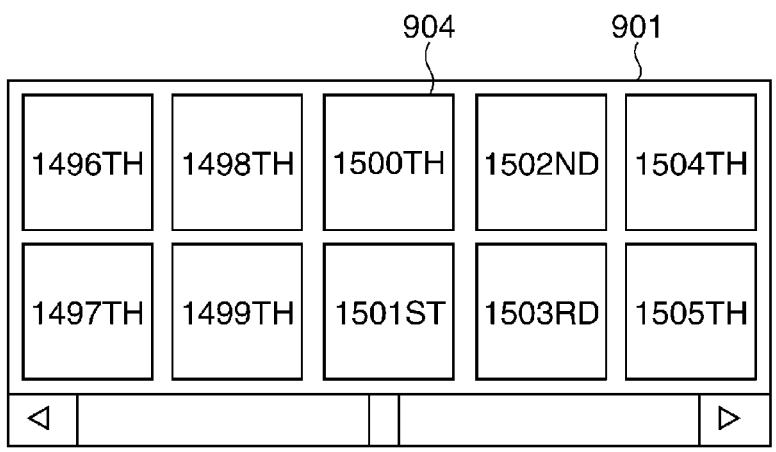

FIGS. 9A and 9B each are a view useful in explaining the display of contents in a range corresponding to a designated position, which is performed by the information processing apparatus, in which FIG. 9A shows a display of contents in a range corresponding to the first designated position shown in FIG. 8, and FIG. 9B shows a display of contents in a range corresponding to the second designated position shown in FIG. 8.

Figure 10A:
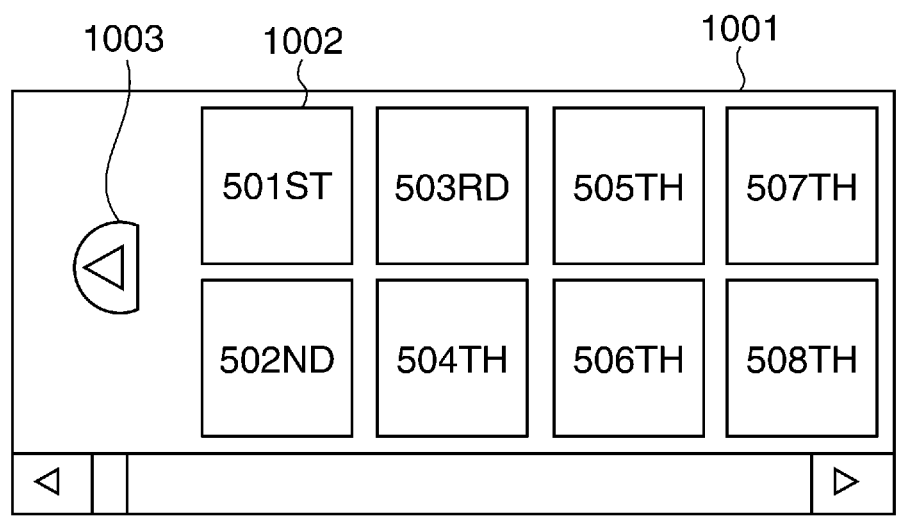
Figure 10B:
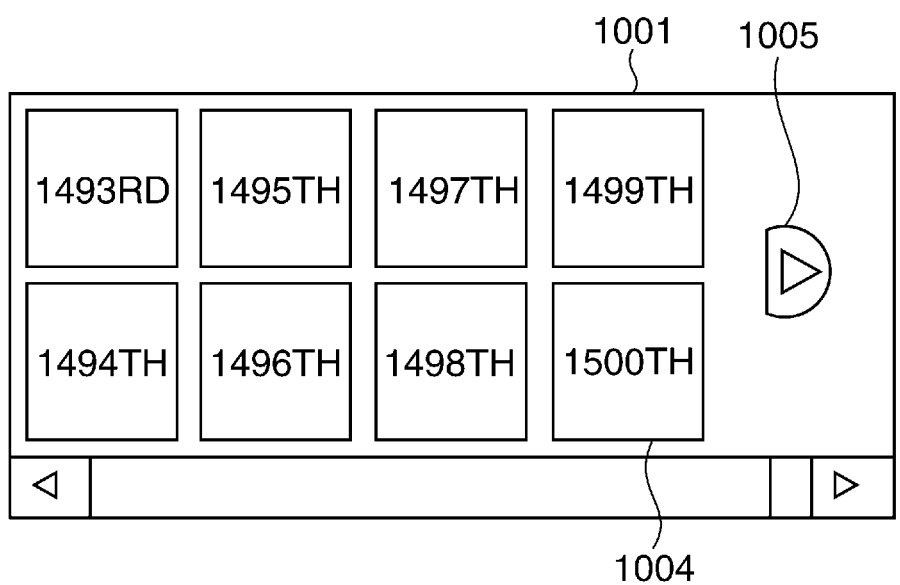

FIGS. 10A and 10B each are a view useful in displaying the display of contents in a range corresponding to a designated position, for comparison with FIGS. 9A and 9B, in which FIG. 10A shows a display of contents in a range corresponding to the first designated position appearing in FIG. 8, and FIG. 10B shows a display of contents in a range corresponding to the second designated position appearing in FIG. 8.

In FIG. 9A, a plurality of contents (497th to 506th contents) are displayed in a display area 901. In the display area 901, the 501st content, denoted by reference numeral 902, corresponding to the designated position 804 appearing in FIG. 8, is displayed.

Similarly, in FIG. 9B, the 1496th to 1505th contents are displayed in the display area 901. In the display area 901, the 1500th content, denoted by reference numeral 904, corresponding to the designated position 805 appearing in FIG. 8 is displayed.

On the other hand, in FIG. 10A, the 501st to 508th contents are displayed in a display area 1001, and further, a display switching button 1003 for switching the display section to a preceding one is displayed.

Similarly, in FIG. 10B, the 1493rd to 1500th contents are displayed in the display area 1001, and further, a display switching button 1005 for switching the display section to a following one is displayed. Further, in FIGS. 10A and 10B, the 501st content, denoted by reference numeral 1002, and the 1500th content, denoted by reference numeral 1004, corresponding to the designated positions 804 and 805, respectively, are displayed.

Let it be assumed that the display section 802 is selected so as to display the 501st content corresponding to the designated position 804 in the display section shown in FIG. 8, and for example, the 501st content 1002 corresponding to the designated position 804 is displayed in such a manner as shown in FIG. 10A. In this case, there arises a problem that contents located before the 501st content 1002 cannot be displayed unless the display switching button 1003 is operated, which increases the operation load on the user.

In contrast, in FIG. 9A, when the display section 801 is selected so as to display the 501st content 902, the 501st content 902 is displayed substantially in the center of the display area 901. As a result, in FIG. 9A, the user can view the content 902 corresponding to the designated position 804 and contents in the vicinity of the content 902 at a time.

Further, let it be assumed that the display section 802 is selected so as to display the 1500th content corresponding to the designated position 805 in the display section shown in FIG. 8, and for example, the 1500th content 1004 corresponding to the designated position 805 is displayed in such a manner as shown in FIG. 10B. In this case, there arises a problem that contents located after the 1500th content 1004 cannot be displayed unless the display switching button 1005 is operated, which increases the operation load on the user.

In contrast, in FIG. 9B, when the display section 803 is selected so as to display the 1500th content 904, the 1500th content 904 is displayed substantially in the center of the display area 901. As a result, in FIG. 9B, the user can view the content 904 corresponding to the designated position 805 and contents in the vicinity of the content 904 at a time.

As described above, in the illustrated examples in FIGS. 9A and 9B, the content corresponding to the designated position 804 or 805 is displayed substantially in the center of the display area 901, thereby enabling the user to view the contents in the vicinity of the content corresponding to the designated position 804 or 805 without any operation.

Hereafter, the display control executed when displaying such screens as shown in FIGS. 9A and 9B will be described.

Figure 11:
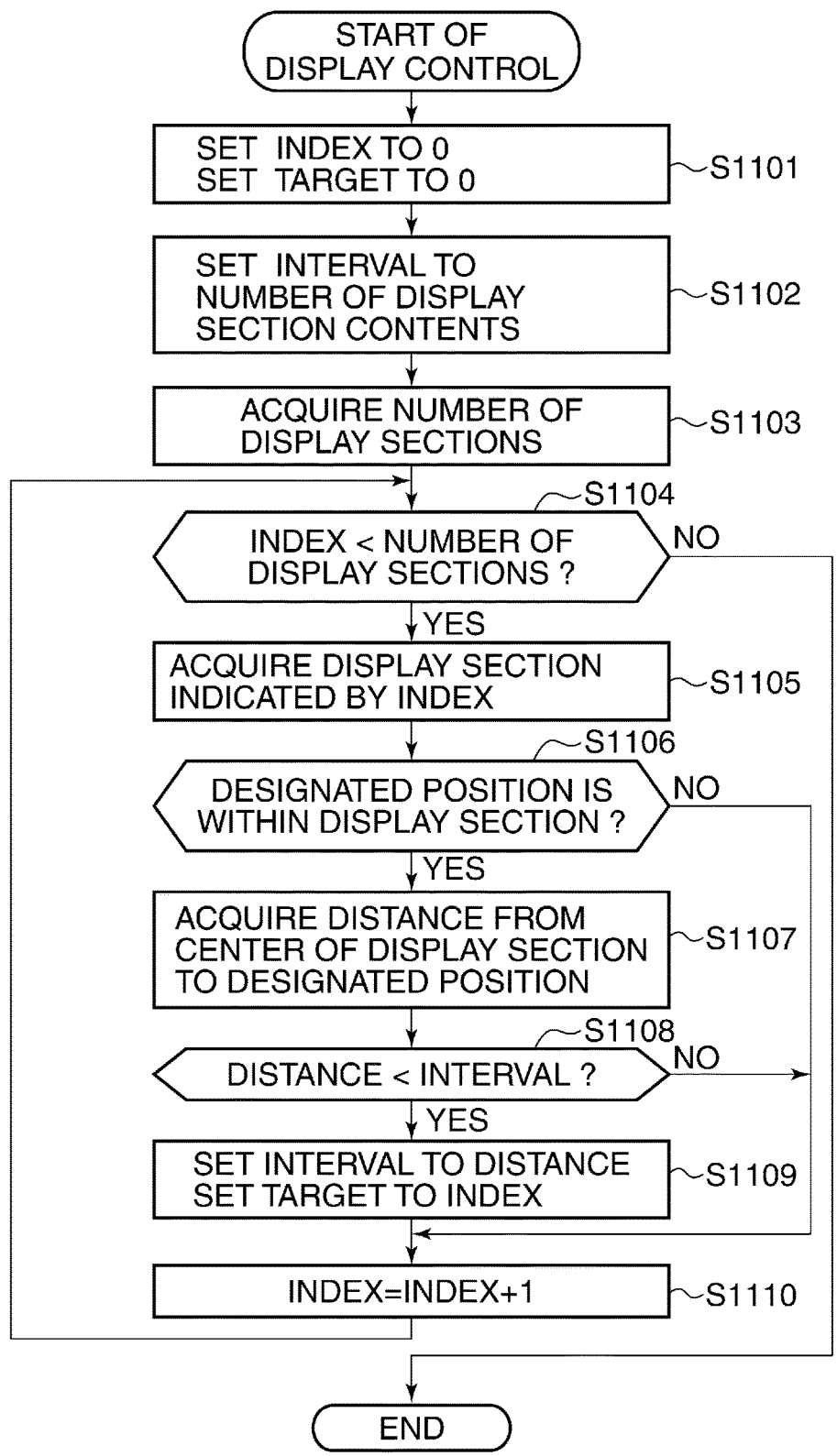
FIG. 11 is a flowchart of a display control process executed by the information processing apparatus according to the fourth embodiment.

FIG. 11 is a flowchart of a display control process executed by the information processing apparatus according to the fourth embodiment. The display control process shown in FIG. 11 is executed by the CPU 106 which reads out and starts a control program stored in the HDD 109, and controls associated units according to the control program.

When the information processing apparatus 100 is started, and a specific folder is selected by a user's operation, the CPU 106 initializes a variable INDEX and a variable TARGET, and sets each of these variables to 0 (step S1101). Note that in the present process, a sequence of display sections start from a display section assigned a display section number of 0 and are disposed in an increasing order of the display section number.

Then, the CPU 106 sets a variable INTERVAL to the number of contents belonging to each display section (step S1102). In the illustrated example in FIG. 8, 1000 contents belong to each display section, and hence the CPU 106 sets the variable INTERVAL to 1000.

Next, the CPU 106 acquires the total number of the display sections (step S1103), and compares the acquired total number of the display sections (the number of display sections) with the variable INDEX to determine whether or not the variable INDEX<the number of display sections holds (step S1104). If the variable INDEX≥the number of display sections holds (NO to the step S1104), the CPU 106 immediately terminates the display control.

On the other hand, if the variable INDEX<the number of display sections holds (YES to the step S1104), the CPU 106 acquires a display section indicated by the variable INDEX (step S1105).

Then, the CPU 106 compares the above-mentioned designated position and the display section indicated by the variable INDEX acquired in the step S1105 to determine whether or not the designated position is located within the display section indicated by the variable INDEX (step S1106).

If the designated position is located within the display section indicated by the variable INDEX (YES to the step S1106), the CPU 106 determines a distance (absolute value) from the center of the display section indicated by the variable INDEX to the designated position, which is represented by the number of contents which are arranged along the distance (step S1107). Then, the CPU 106 compares the determined distance with the variable INTERVAL to determine whether or not the distance<the variable INTERVAL holds (step S1108).

If the distance<the variable INTERVAL holds (YES to the step S1108), the CPU 106 sets the variable INTERVAL to the above-mentioned distance, and sets the variable TARGET to the value of the variable INDEX (step S1109). Then, the CPU 106 increments the variable INDEX (INDEX=INDEX+1) (step S1110), and returns to the step S1104.

If the designated position is not located within the display section indicated by the variable INDEX in the step S1106 (NO to the step S1106), the CPU 106 directly proceeds to the step S1110. Further, in the step S1108, if the above-mentioned distance≥the variable INTERVAL holds (NO to the step S1108), the CPU 106 also directly proceeds to the step S1110.

By executing the display control as described above, for example, from the display sections appearing in FIG. 8, if the display section 801 is selected for the 501st content corresponding to the designated position 804, the 501st content 902 is displayed in the center of the display area 901 as shown in FIG. 9A.

Similarly, from the display sections appearing in FIG. 8, if the display section 803 is selected for the 1500th content corresponding to the designated position 805, the 1500th content 904 is displayed in the center of the display area 901 as shown in FIG. 9B.

Figure 12A:
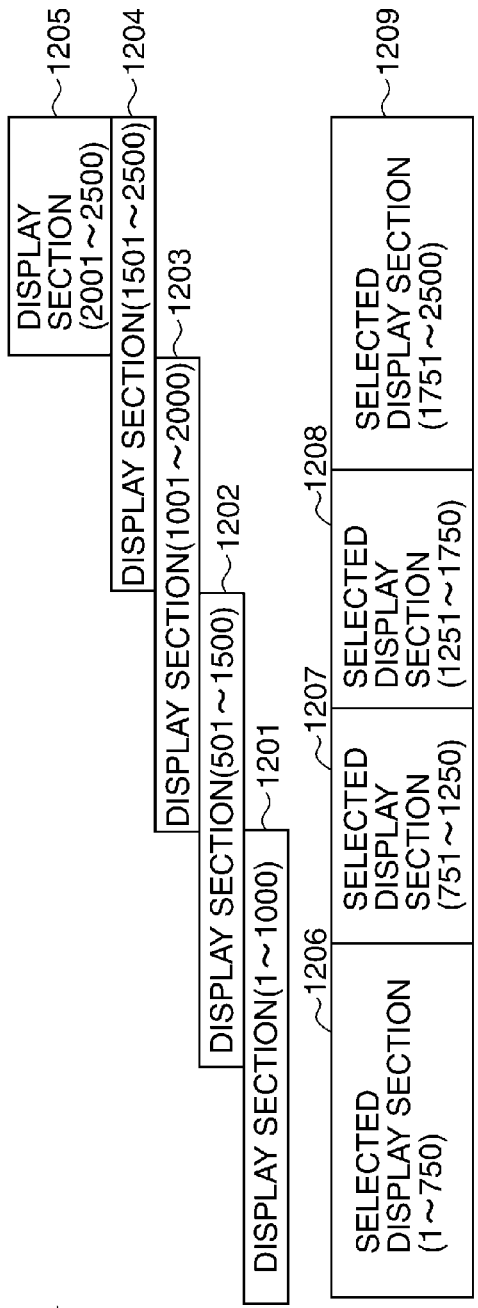
Figure 12B:
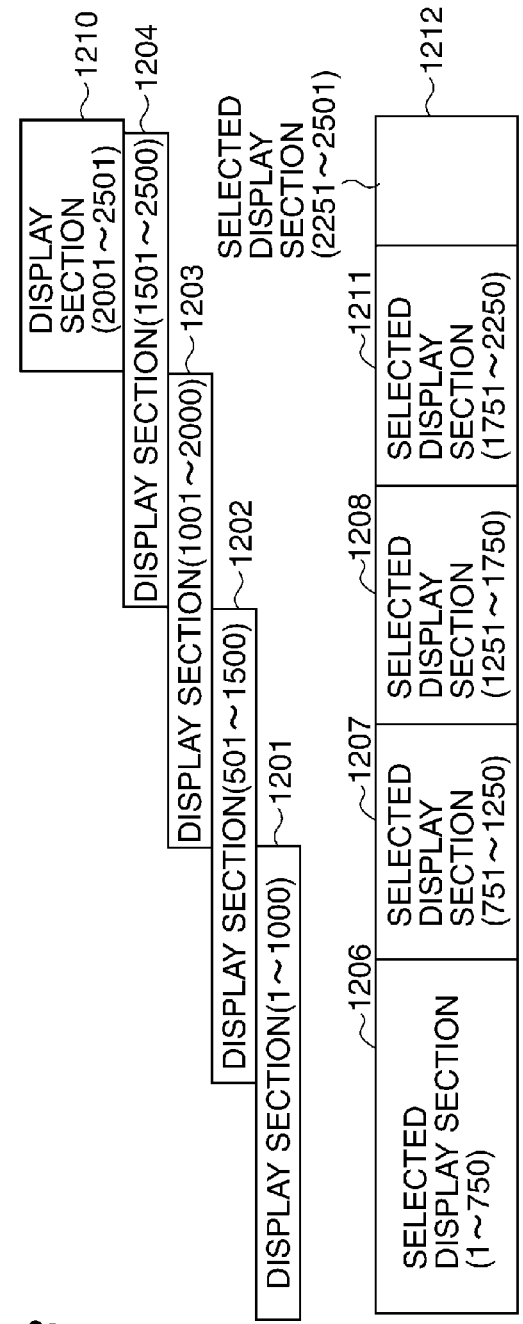

FIGS. 12A and 12B are diagrams useful in explaining selection of a display section, which is performed by the information processing apparatus according to the fourth embodiment, in which FIG. 12A shows selection of a display section in a case where the number of contents is 2500, and FIG. 12B shows selection of a display section in a case where the number of contents is 2501.

In FIGS. 12A and 12B, first to 1000th contents belong to a section 1201, and 501st to 1500th contents belong to a display section 1202. Similarly, 1001st to 2000th contents belong to a display section 1203, and 501st to 2500th contents belong to a display section 1204. Further, 2001st to 2500th contents belong to a display section 1205, and 2001st to 2501st contents belong to a display section 1210.

Note that the contents in the display section 1205 shown in FIG. 12A are included in the contents belonging to the display section 1204, and hence the display section 1205 is unnecessary, but is illustrated for the purpose of contrast with the display section 1210 shown in FIG. 12B.

Further, the display sections 1206 to 1209, 1211, and 1212, shown in FIGS. 12A and 12B, are selection display sections for selection according to the above-mentioned designated position. As shown in FIGS. 12A and 12B, out of the contents in the display section 1201, first to 750th contents belong to the selection display section 1206. Out of the contents in the display section 1202, 751st to 1250th contents belong to the selection display section 1207.

Out of the contents in the display section 1203, 1251st to 1750th contents belong to the selection display section 1208. Out of the contents in the display section 1204, 1751st to 2500th contents belong to the selection display section 1209.

As described above, in the illustrated example, the selection display section is selected by taking into consideration an overlap of display sections. Note that there is no selection display section preceding the selection display section 1206, and hence the selection display section 1206 is set to be larger in range than the selection display section 1207 and the selection display section 1208.

Further, in the selection display section 1209, the contents corresponding to the display section 1205 are included in the contents corresponding to the display section 1204, and hence the selection display section 1209 is set to be larger than the selection display section 1207 and the selection display section 1208.

In FIG. 12B, 2001st to 2501st contents belong to the display section 1210. 1751st to 2250th contents belonging to the display section 1204 belong to the selection display section 1211. 2251st to 2501st belonging to the display section 1210 belong to the selection display section 1212.

In the present embodiment, the selection display section is adjusted according to the state of the last display section, as described hereinafter. Hereafter, selection and adjustment of the selection display section will be described.

Figure 13:
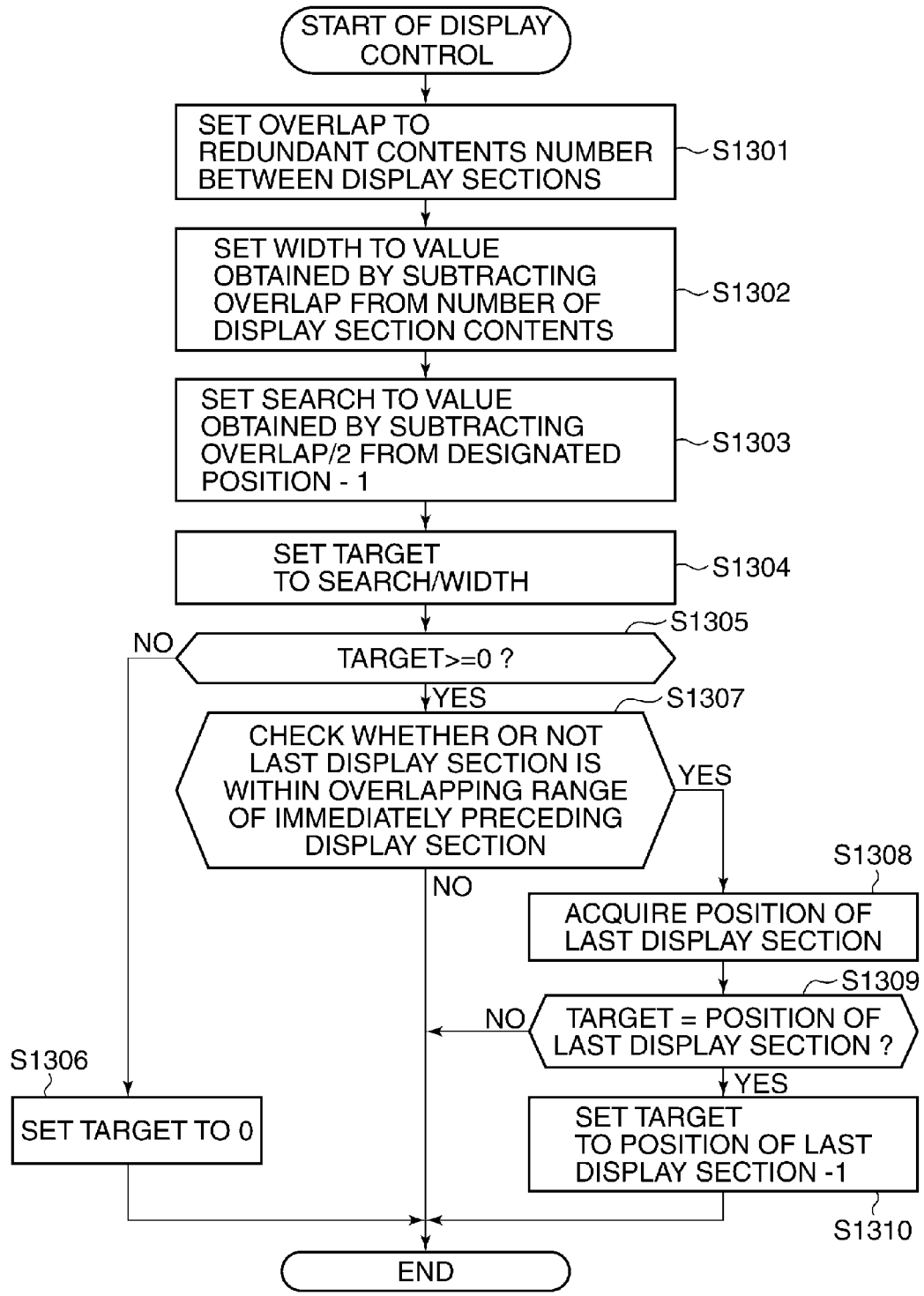
FIG. 13 is a flowchart of a process for selecting and adjusting a selected display section, which is executed by the information processing apparatus according to the fourth embodiment.

FIG. 13 is a flowchart of a process for selecting and adjusting a selection display section, which is executed by the information processing apparatus according to the fourth embodiment. The process shown in FIG. 13 is executed by the CPU 106 which reads out and starts a control program stored in the HDD 109, and controls associated units according to the control program.

When the information processing apparatus 100 is started, and a specific folder is selected by a user's operation, the CPU 106 sets a variable OVERLAP to the redundant contents number indicative of the number of contents redundant between each adjacent pair of display sections (step S1301). In the illustrated examples in FIGS. 12A and 12B, the redundant contents number is 500.

Then, the CPU 106 sets a variable WIDTH to a value obtained by subtracting the variable OVERLAP from the number of display section contents (step S1302). In the illustrated examples in FIGS. 12A and 12B, the variable WIDTH is 500.

Next, the CPU 106 sets a variable SEARCH to a value obtained by subtracting 1 from the designated position, and then further subtracting the variable OVERLAP×½ (step S1303). In this example, it is assumed that the designated position is indicated by an integer starting with 1, and hence a value of 1 is subtracted in calculating the value to which the variable SEARCH is set.

Then, the CPU 106 sets the variable TARGET to a value obtained by dividing the variable SEARCH by the variable WIDTH (step S1304). For example, assuming that the designated position corresponds to the 1500th content, the variable TARGET is obtained by the equation of the variable TARGET=(1500−1−500/2)/500, and as a result, the variable TARGET becomes equal to 2. That is, in the case of the example shown in FIG. 8, the display section 803 is selected by the 1500th content corresponding to the designated position 805.

Then, the CPU 106 compares the variable TARGET with 0, and determines whether or not the variable TARGET≥0 holds (step S1305). If the variable TARGET<0 holds (NO to the step S1305), the CPU 106 sets the variable TARGET to 0 (step S1306), followed by terminating the present process. This makes it possible to select the selection display section 1206 appearing in FIGS. 12A and 12B.

If the variable TARGET≥0 holds (YES to the step S1305), the CPU 106 determines whether or not the last display section is an overlapping range of the immediately preceding display section (step S1307). If the last display section is the overlapping range of the immediately preceding display section (YES to the step S1307), the CPU 106 acquires a numerical value corresponding to the last display section (step S1308). For example, in FIG. 12A, the numerical value corresponding to the last display section is 4.

Then, the CPU 106 compares the variable TARGET with the numerical value corresponding to the last display section acquired in the step S1308, to thereby determine whether or not the variable TARGET=the numerical value corresponding to the last display section holds (step S1309). If the variable TARGET=the numerical value corresponding to the last display section holds (YES to the step S1309), the CPU 106 sets the variable TARGET to a value of (the numerical value corresponding to the last display section−1) (step S1310), followed by terminating the present process. This makes it possible to select the selection display section 1204 shown in FIG. 12A.

If it is determined in the step S1307 that the last display section is not an overlapping range of the immediately preceding display section (NO to the step S1307), the CPU 106 immediately terminates the present process. Further, if it is determined in the step S1309 that the variable TARGET is not equal to the numerical value corresponding to the last display section (NO to the step S1309), the CPU 106 immediately terminates the present process.

In the step S1307, for example, as in the case of the display section 1205 appearing in FIG. 12A, if all of the contents in the display section 1205 as the last display section are in the overlapping range of the display section 1204, the CPU 106 proceeds to the step S1308. On the other hand, as in the case of the display section 1210 appearing in FIG. 12B, if all of the contents in the display section 1210 as the last display section are not in the overlapping range of the display section 1204, the CPU 106 immediately terminates the present process.

For example, in the case of the display sections appearing in FIG. 8, when the display section 801 is selected for the 501st content corresponding to the designated position 804, the 501st content corresponding to the designated position 804 is displayed in the center of the display area 901 as shown in FIG. 9A.

Similarly, in the case of the display sections appearing in FIG. 8, when the display section 803 is selected for the 1500th content corresponding to the designated position 805, the 1500th content corresponding to the designated position 805 is displayed in the center of the display area 901 as shown in FIG. 9B.

Note that if the display section selected as above is the currently displayed display section, it is only necessary to scroll the display area.

As described above, in the fourth embodiment of the present invention, when a content designated by the user belongs two or more display sections, the display section in which the content designated by the user is located in the center or its vicinity is selected. This enables the user to view the content designated by the user and its vicinity at a time upon switching of the display section, which improves operability.

As is clear from the above description, in the illustrated example in FIG. 1, the CPU 106 functions as a selection unit, a display control unit, and a determination unit.

Figure 14:
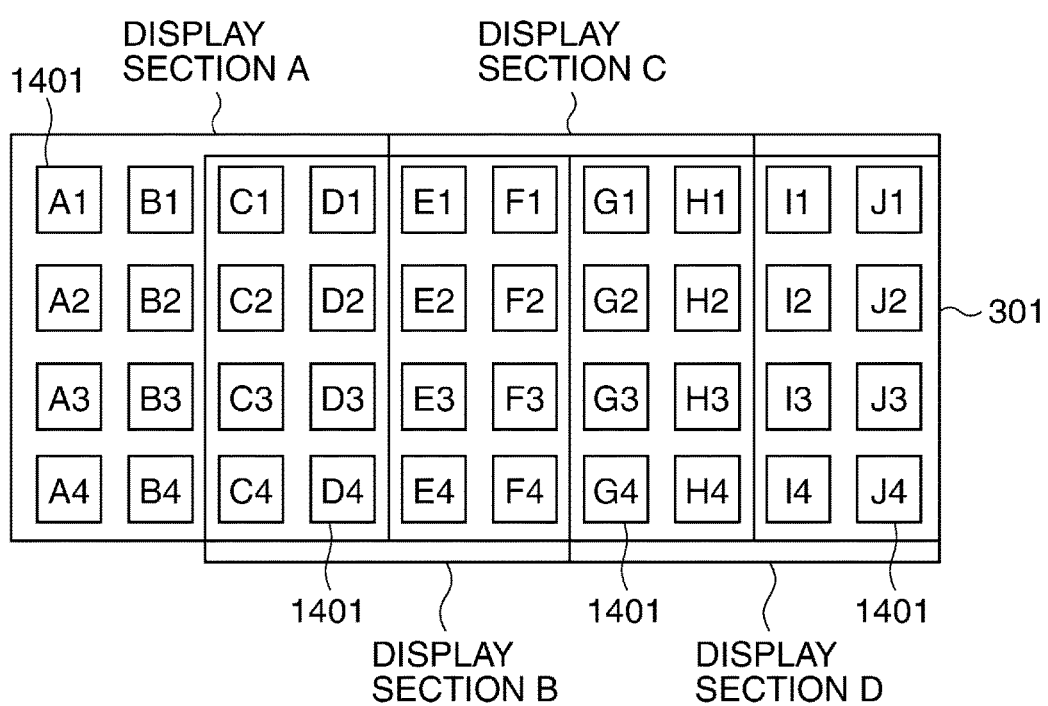
FIG. 14 is a view useful in explaining the display of contents in the display sections, which is performed by the information processing apparatus shown in FIG. 1.

FIG. 14 is a view useful in explaining the display of contents in the display sections, which is performed by the information processing apparatus 100 according to a fifth embodiment of the present invention.

The illustrated example in FIG. 14 shows first to fourth display sections A to D as the display sections. In this example, each of the first to fourth display sections A to D contains 16 contents 1401. Further, in the first to fourth display sections A to D, a ratio of redundant contents (redundancy ratio) is 50%.

The first display section A contains contents A1 to D4, and the second display section B contains contents C1 to F4. Further, the third display section C contains contents E1 to H4, and the fourth display section D contains contents G1 to J4.

As shown in FIG. 14, contents C1 to D4 are redundant between the first display section A and the second display section B, and contents E1 to F4 are redundant between the second display section B and the third display section C. Further, contents G1 to H4 are redundant between the third display section C and the fourth display section D.

FIGS. 15A to 15H are views useful in explaining switching between display sections appearing in FIG. 14, in which FIG. 15A shows a display of the first display section A, FIG. 15B shows a display of the first display section A after coping with a blank space, FIG. 15C shows a display of the second display section B, FIG. 15D shows a display of the second display section B after coping with a blank space, FIG. 15E shows a display of the third display section C, FIG. 15F shows a display of the third display section C after coping with a blank space, FIG. 15G shows a display of the fourth display section D, and FIG. 15H shows a display of the fourth display section D after coping with a blank space. In FIGS. 15A to 15H, the maximum number of contents which can be displayed per one column in the display area is three.

In this case, let it be assumed, as shown in FIG. 15A, that the contents A1 to D4 are displayed in the display area as a content group 1502 in the first display section A.

Since the first display section A is a display section located at the starting end of the sequence of the first to fourth display sections A to D, the content A1 located at the starting end of the content group 1502 is displayed at the starting end (upper left corner) of the display area. Then, the contents up to the content D4 are displayed in the display area according to a predetermined order. At this time, the maximum number of contents which can be displayed in one column of the display area is three, and hence only the content D4 is displayed in the terminating column of the display area.

As a result, a blank space corresponding to two contents is produced in the terminating column of the display area, which gives the user an impression that there is no more content and the sequence of display sections is terminated at the first display section A. This makes it difficult for the user to recognize that there are other contents, and the second display section B following the display section A exists.

In contrast, in the case of FIG. 15B, the contents A1 to D3 in the first display section A are displayed in the display area as a content group 1503 by coping with the blank space in the terminating column. That is, the content D4 located in the terminating column in FIG. 15A (the content located in the column where a blank space is produced) is caused not to be displayed. Then, the display area is reduced by an amount corresponding to the terminating column to thereby prevent a blank space from being produced. This makes it easy for the user to recognize that the second display section B following the first display section A exists.

Further, let it be assumed, as shown in FIG. 15C, that the contents C1 to F4 are displayed in the display area as a content group 1504 in the second display section B. Since the second display section B is a display section following the first display section A, the content C1 located at the starting end of the content group 1504 is displayed at the same display position in the direction of column as in the first display section A. Then, the contents up to the content F4 are displayed in the display area in a predetermined order.

At this time, since the maximum number of contents which can be displayed in one column of the display area is three, only the content C1 is displayed in the starting column of the display area.

As a result, a blank space corresponding to two contents is produced in the starting column of the display area, and hence the user is likely to misunderstand that there is no content before the second display section B and the second display section B is the starting end display section. That is, there is a problem that the user is likely to misunderstand that the first display section A does not exist before the second display section B.

In contrast, in the case of FIG. 15D, the contents C2 to F4 in the second display section B are displayed as a content group 1505 in the display area by coping with the blank space in the starting column of the display area. That is, the content C1 located in the starting column in FIG. 15C (the content located in the column where a blank space is produced) is caused not to be displayed. Then, the display area is reduced by an amount corresponding to the starting column to thereby prevent a blank space from being produced. This enables the user to easily recognize that the first display section A exists before the second display section B.

Further, let it be assumed, as shown in FIG. 15E, that the contents E1 to H4 are displayed in the display area as a content group 1506 in the third display section C. Since the third display section C is a display section following the second display section B, the content E1 located at the starting end of the content group 1506 is displayed at the same display position in the direction of column as in the second display section B. Then, the contents up to H4 are displayed in the display area in a predetermined order.

At this time, since the maximum number of contents which can be displayed in one column of the display area is three, the contents E1 and E2 are displayed in the starting column of the display area. Further, the contents H3 and H4 are displayed in the terminating column of the display area.

As a result, a blank space corresponding to one content is produced in both the starting and terminating columns, which gives the user an impression that there is no content before or after the third display section C, and it is difficult for the user to recognize that the second display section B exists before the third display section C, and the fourth display section D exists after the third display section C.

In contrast, in the case of FIG. 15F, the contents E3 to H2 in the third display section C are displayed in the display area as a content group 1507 after coping with the blank spaces in the starting and terminating columns of the display area. That is, the contents E1 and E2 located in the starting column, and the contents H3 and H4 located in the terminating column in FIG. 15E (contents located in the columns where a blank space is produced) are caused not to be displayed. Then, the display area is reduced by amounts corresponding to the starting and terminating columns to thereby prevent blank spaces from being produced.

This makes it easy for the user to recognize that the second display section B exists before the third display section C, and the fourth display section D exists after the third display section C.

Let it be assumed, as shown in FIG. 15G, that the contents G1 to J4 are displayed in the display area as a content group 1508 in the fourth display section D. Since the fourth display section D is a display section following the third display section C, the content G1 located at the starting end of the content group 1508 is displayed at the same display position in the direction of column as in the third display section C. Then, the contents up to the contents J4 are displayed in the display area in a predetermined order. At this time, since the maximum number of contents which can be displayed in one column of the display area is three, only the content J4 is displayed in the terminating column of the display area.

Although a blank space corresponding to two contents is produced in the terminating column of the display area with respect to the fourth display section D, since the fourth display section D is the last display section, there is no display section following the fourth display section D.

Therefore, it is only necessary to cause the user to recognize that the fourth display section D is the last display section, and it is not necessary to cope with a blank space in the display area as in the other display sections. That is, even if a blank space in the terminating column is taken into consideration, since the fourth display section D is the last display section, as shown in FIG. 15H, the contents G1 to J4 are displayed in the display area as a content group 1509.

Although in the illustrated examples in FIGS. 15A to 15H, the maximum number of contents which can be displayed in one column of the display area is set to three, irrespective of the maximum number of contents which can be displayed in one column, when a blank space is produced in the starting or terminating column of the display area, a column where a blank space is produced is eliminated from the display area to thereby enable the user to easily recognize that a preceding or following display section exists.

FIG. 16 is a flowchart of a process for displaying contents, which is executed by the information processing apparatus 100. The display process in FIG. 16 is executed by the CPU 106 which reads out and starts a control program stored in the HDD 109, and controls associated units according to the control program.

When a specific folder is selected by a user's operation, the CPU 106 acquires the number of all contents contained in the selected folder as the number of contents to be displayed (step S1601). In this step, the number of contents to be displayed is e.g. the number of contents in the content group 201 appearing in FIG. 2, described in the first embodiment.

Then, the CPU 106 acquires the number of display section contents from the HDD 109 (step S1602). The number of display section contents is set and stored in the HDD 109 in advance. Note that the number of display section contents is the number of contents in each of the display sections "1" to "5" (i.e. in one display section) including the overlapping part, appearing in FIG. 2.

Next, the CPU 106 acquires a ratio of redundant contents between each pair of adjacent display sections (redundancy ratio) from the HDD 109 (step S1603). The redundancy ratio is set and stored in the HDD 109 in advance.

Then, the CPU 106 calculates the number of contents redundant between the adjacent display sections according to the number of display section contents and the redundancy ratio (step S1604). For example, assuming that the number of display section contents is 1000 and the redundancy ratio is 50%, the CPU 106 sets the number of contents redundant between the adjacent display sections to 500.

If the number of contents redundant between the adjacent display sections is not an integer value, the CPU 106 rounds the number up or down to the whole number to thereby set the number of contents redundant between the adjacent display sections to an integer value. The number of contents redundant between the adjacent display sections is hereinafter referred to as the number of redundant contents.

Next, the CPU 106 determines a starting point of display of contents (hereinafter referred to as the contents display starting point) at the starting end of each of the display sections according to the number of contents to be displayed, the number of display section contents, and the number of redundant contents (step S1605). For example, assuming that the number of contents to be displayed is 3000, the number of display section contents is 1000, and the number of overlapping contents is 500, the contents display starting point for the display section "1" appearing in FIG. 2 is a 1st content, and the contents display starting point for the display section "2" is a 501st content. Further, the contents display starting point for the display section "3" is a 1001st content, and the contents display starting point for the display section "4" is a 1501st content. Further, the contents display starting point for the display section "5" is a 2001st content.

Then, the CPU 106 selects a display section from which a content group is to be selected and displayed on the display area 205 and which is to be scrolled by a scroll operation (step S1606). In doing this, the CPU 106 selects the display section to be scrolled according to a user's operation of moving a knob in the scroll bar. For example, if the content group in the display section "2" is currently selected by the user's operation of moving the knob in the scroll bar, the CPU 106 determines the display section "2" as the display section to be scrolled.

As a display section to be scrolled first, the CPU 106 may select a display section having a content positioned at the center of all contents to be displayed. Further, the CPU 106 may store information on a display section having been selected at the termination of the display on the immediately preceding occasion, in the HDD 109, and initially select the display section on which the information stored in the HDD 109 as the display section to be scrolled, for the display on the current occasion.

Then, the CPU 106 acquires, from the HDD 109, contents in the display section selected in the step S1606 (hereinafter referred to as the selected display section), corresponding in number to the number of display section contents starting from the contents display starting point in the selected display section (step S1607).

Then, the CPU 106 determines the maximum number of contents which can be displayed in one column of the display area 205 (step S1608). In doing this, the CPU 106 determines the maximum number of contents which can be displayed in one column by taking into consideration the size of the display area 205 and the display size of each content such that all contents in the selected display section can be displayed in the display area 205.

Then, the CPU 106 determines whether or not there is a display section preceding the selected display section (step S1609). If there is a display section preceding the selected display section (YES to the step S1609), the CPU 106 determines whether or not a content positioned at the starting end of the selected display section is located at the starting end position i.e. top of the column when the selected display section is displayed on the display area (step S1610).

If the content positioned at the starting end of the selected display section is not located at the starting end position of the column (NO to the step S1610), the CPU 106 determines that a content or contents in the selected display section to be displayed in the starting column is/are to be placed outside the range of contents to be displayed in the display area. That is, the CPU 106 determines that the content(s) arranged in the starting column for the selected display section is/are not to be displayed in the display area (step S1611).

In the present example, the term "the content(s) arranged in the starting column for the selected display section" is intended to mean "a content positioned at the starting end of the selected display section and a content or contents to be displayed in the same display column as the above-mentioned content positioned at the starting end when the contents in the selected display section are displayed in the display area, provided that such a content or contents exist(s)".

Then, the CPU 106 determines whether or not a display section exists after the selected display section (step S1612). If a display section exists after the selected display section (YES to the step S1612), the CPU 106 first adds up the number of contents from the leading end of all contents to be displayed to the contents display starting point and the number of contents in the display section to thereby obtain a value of the sum of them. Then, the CPU 106 determines whether or not the obtained value of the sum is dividable by the maximum number of contents which can be displayed in one column of the display area (step S1613).

If the obtained value of the sum is not dividable by the maximum number of contents which can be displayed in one column of the display area (NO to the step S1613), the CPU 106 determines that the contents corresponding to the terminating column in the selected display section are to be put outside the range of contents to be displayed. That is, the CPU 106 determines that the content(s) arranged in the terminating column for the selected display section is/are not to be displayed in the display area (step S1614).

In the present embodiment, the term "the content(s) arranged in the terminating column for the selected display section is intended to mean "a content positioned at the terminating end of the selected display section, and a content or contents to be displayed in the same display column as the above-mentioned content positioned at the terminating end when the contents corresponding in number to the sum of the contents from the leading end of all contents to the contents display starting point and the contents in the display section are sequentially arranged in columns such that each column is filled up to the maximum number of contents which can be displayed in one column of the display area.

Then, the CPU 106 displays, out of the contents acquired in the step S1607, the contents except those determined to be put outside the range of contents to be displayed, in the display area 205 (step S1615), followed by terminating the display process. At this time, the CPU 106 reduces the display area 205 in accordance with the number of contents to be put outside the range.

If no display section exists before the selected display section (NO to the step S1609), the CPU 106 directly proceeds to the step S1612. Further, if the content positioned at the starting end of the selected display section is located at the starting end of the column (YES to the step S1610), the CPU 106 also directly proceeds to the step S1612.

If no display section exists after the selected display section (NO to the step S1612), the CPU 106 directly proceeds to the step S1615. Further, if the obtained value of the sum is dividable by the maximum number of contents which can be displayed in one column of the display area (YES to the step S1613), the CPU 106 directly proceeds to the step S1615.

As described above, in the present embodiment, it is determined whether or not a display section exists before or after the selected display section, and further, it is determined whether or not to cause a content or contents not to be displayed, according to the display position thereof in a display column in the display area for contents redundant between the adjacent display sections, and hence the user can easily recognize continuity of the display sections and continuity of the contents.

That is, in the present embodiment, it is determined whether or not the number of contents in the starting or terminating column for a selected display section is less than the maximum number of contents which can be displayed in one column of the display area. Then, if the number of content(s) in the starting or terminating column is less than the maximum number of contents which can be displayed in one column of the display area, the content(s) in the starting or terminating column is/are caused not to be displayed in the display area when a display section exists before or after the selected display section. This prevents a blank space from being produced in the display area, and hence enables the user to easily recognize that a display section exists before or after the selected display section, and as a result the user can easily recognize continuity of the display sections.

Note that the above-described operation of the information processing apparatus 100 may be realized by a plurality of computers. For example, the CPU 106 of the first computer may execute the steps S1601 to S1614, and generate and send display screen data to the second computer so as to display the contents acquired in the step S1605 except those determined to be outside the range of contents to be displayed, in the display area 205. Then, the CPU 106 of the second computer may cause the screen display data received from the first computer to be displayed on the display 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2012-010103, filed Jan. 20, 2012, No. 2012-010102, filed Jan. 20, 2012, which are hereby incorporated by reference herein in their entirety.

What is claimed is:

1. An information processing apparatus that divides a plurality of contents into a plurality of successive display sections, and displays the contents on a display section-by-display section basis, comprising:
   a processor connected to a memory, the processor and memory being configured to:
   select and arrange the contents such that a plurality of whole individual contents selected as objects to be displayed are redundant between adjacent ones of the display sections at a predetermined ratio of redundant contents to displayed contents;
   calculate a number of contents which can be displayed per one column in the display area, according to a size of a display area where the contents are to be displayed, and a display size of the contents;
   determine whether there occurs a column having a smaller number of contents than said number of contents; and
   when displaying contents belonging to a selected one of the plurality of display sections, in the display area, in a case where it is determined that there occurs a column having a smaller number of contents than said number of contents, cause the contents of the column having a smaller number of contents not to be displayed, and the other contents in other columns to be displayed in the display area.

2. The information processing apparatus according to claim 1, wherein in a case where a display section exists before the selected display section, when a content positioned at the starting end of the selected display section is not located at the starting end of a column in the display area when the contents in the selected display section are displayed in the display area, contents of the selected display section corresponding to a starting column when displayed in the display area are caused not to be displayed.

3. The information processing apparatus according to claim 1, wherein in a case where a display section exists after the selected display section, a starting point indicative of a content at the starting end of each display section is determined, as a contents display starting point, according to the number of contents as the objects to be displayed, the number of display section contents, and the number of redundant contents, and
   wherein in a case where a value obtained by adding the number of contents from the starting end of the contents as the objects to be displayed to the contents display starting point and the number of display section contents is not dividable by said number of contents which can be displayed per one column in the display area, contents of the selected display section corresponding to a terminating column when displayed in the display area are caused not to be displayed.

4. The information processing apparatus according to claim 1, wherein the display area is reduced by an amount corresponding to a column in which the contents caused not to be displayed would have otherwise been displayed.

5. A method of controlling, by a computer, an information processing apparatus that that divides a plurality of contents into a plurality of successive display sections, and displays the contents on a display section-by-display section basis, comprising:
   selecting, by the computer, and arranging the contents such that a plurality of whole individual contents selected as objects to be displayed are redundant between adjacent ones of the display sections at a predetermined ratio of redundant contents to displayed contents;
   calculating, by the computer, a number of contents which can be displayed per one column in the display area, according to a size of a display area where the contents are to be displayed, and a display size of the contents;
   determining whether there occurs a column having a smaller number of contents than said number of contents; and
   causing, by the computer, when displaying contents belonging to a selected one of the plurality of display sections, in the display area, in a case where there it is determined that occurs a column having a smaller number of contents than said number of contents, the contents of the column having a smaller number of contents not to be displayed, and the other contents in other columns to be displayed in the display area.

6. A non-transitory computer-readable storage medium storing a computer-executable control program for causing a computer to execute a method of controlling an information processing apparatus that that divides a plurality of contents into a plurality of successive display sections, and displays the contents on a display section-by-display section basis, wherein the method comprises:

selecting, by the computer, and arranging the contents such that a plurality of whole individual contents selected as objects to be displayed are redundant between adjacent ones of the display sections at a predetermined ratio of redundant contents to displayed contents;

calculating, by the computer, a number of contents which can be displayed per one column in the display area, according to a size of a display area where the contents are to be displayed, and a display size of the contents;

determining whether there occurs a column having a smaller number of contents than said number of contents; and causing, by the computer, when displaying contents belonging to a selected one of the plurality of display sections, in the display area, in a case where there it is determined that occurs a column having a smaller number of contents than said number of contents, the contents of the column having a smaller number of contents not to be displayed, and the other contents in other columns to be displayed in the display area.

* * * * *